(12) United States Patent
Matsuda et al.

(10) Patent No.: US 7,311,326 B2
(45) Date of Patent: Dec. 25, 2007

(54) DISTANCE DETECTING APPARATUS, AIR BAG SYSTEM CONTROLLING APPARATUS, AND METHOD OF DETECTING DISTANCE

(75) Inventors: Mieko Matsuda, Kanagawa (JP); Kenichi Maeda, Kanagawa (JP); Atsuto Maki, Kyoto (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 298 days.

(21) Appl. No.: 10/821,961

(22) Filed: Apr. 12, 2004

(65) Prior Publication Data
US 2005/0040632 A1 Feb. 24, 2005

(30) Foreign Application Priority Data
Aug. 20, 2003 (JP) ............................ 2003-296779

(51) Int. Cl.
*B60R 21/015* (2006.01)
(52) U.S. Cl. ..................................... 280/735; 356/4.01
(58) Field of Classification Search ................ 280/735; 382/103, 106; 356/4.01, 4.02, 4.03, 4.04, 356/4.05, 4.06, 4.07
See application file for complete search history.

(56) References Cited

U.S. PATENT DOCUMENTS

| | | | | |
|---|---|---|---|---|
| 5,786,602 A * | 7/1998 | Pryor et al. | ............ | 250/559.33 |
| 6,236,035 B1 * | 5/2001 | Saar et al. | ................... | 250/221 |
| 6,373,557 B1 * | 4/2002 | Mengel et al. | ............. | 356/4.07 |
| 6,422,598 B1 * | 7/2002 | Yasui | .......................... | 280/735 |
| 6,441,888 B1 * | 8/2002 | Azuma et al. | ............. | 356/4.01 |
| 6,572,139 B2 * | 6/2003 | Adachi | ........................ | 280/735 |
| 6,618,123 B2 * | 9/2003 | Uomori et al. | ............. | 356/3.12 |
| 6,678,598 B1 * | 1/2004 | Hillebrand et al. | ........... | 701/45 |
| 6,704,114 B1 * | 3/2004 | Poechmuller | ............... | 356/601 |
| 6,724,490 B2 * | 4/2004 | Ono | .......................... | 356/614 |
| 6,781,676 B2 * | 8/2004 | Wallace et al. | ............. | 356/4.03 |
| 6,921,106 B2 * | 7/2005 | Yasui | ........................ | 280/735 |
| 2001/0052985 A1 * | 12/2001 | Ono | .......................... | 356/614 |
| 2005/0121892 A1 * | 6/2005 | Li et al. | ..................... | 280/735 |

FOREIGN PATENT DOCUMENTS

| | | |
|---|---|---|
| JP | 5-272969 | 10/1993 |
| JP | 11-14753 | 1/1999 |
| JP | 11-15980 | 1/1999 |
| JP | 2001-213268 | 8/2001 |
| JP | 2001-307077 | 11/2001 |
| JP | 2003-137061 | 5/2003 |

* cited by examiner

*Primary Examiner*—Paul N. Dickson
*Assistant Examiner*—Barry Gooden, Jr.
(74) *Attorney, Agent, or Firm*—Oblon, Spivak, McClelland, Maier & Neustadt, P.C.

(57) ABSTRACT

A light emitting unit emits a light in a light emitting direction, which is the direction to an object, the light having a distributed pattern in a predetermined direction. A photographing device obtains an image of the object along a photographing direction. A holding mechanism holds the light emitting unit and the photographing apparatus in such a relation that (a) the photographing direction is not in a plane that includes both the light emitting direction and the predetermined direction of the distributed pattern, and (b) the photographing direction is not parallel to the light emitting direction. A distance deriving unit derives a distance between the object and a predetermined position based on the image obtained by the photographing device.

9 Claims, 23 Drawing Sheets

FIG.9

| DISTANCE | POSITION OF REFLECTED LIGHT Ph |
|---|---|
| $Z_1$ | $P_1$ |
| $Z_2$ | $P_2$ |
| ⋮ | ⋮ |
| ⋮ | ⋮ |
| ⋮ | ⋮ |
| ⋮ | ⋮ |
| ⋮ | ⋮ |
| $Z_n$ | $P_n$ |

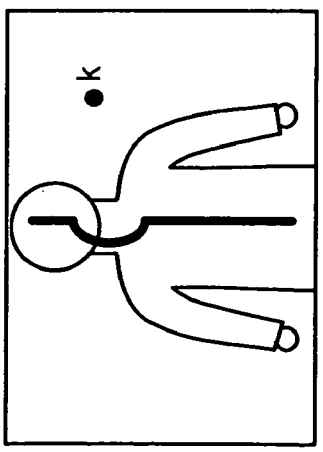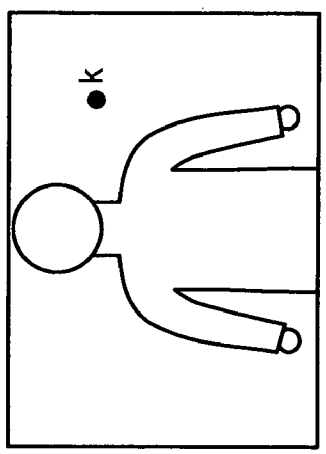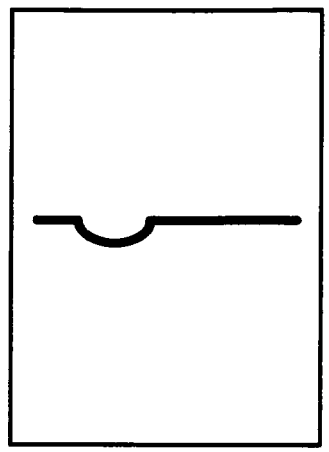
FIG.28

DISTANCE DETECTING APPARATUS, AIR BAG SYSTEM CONTROLLING APPARATUS, AND METHOD OF DETECTING DISTANCE

CROSS-REFERENCE TO RELATED APPLICATIONS

This application is based upon and claims the benefit of priority from the prior Japanese Patent Applications No. 2003-296779 filed on Aug. 20, 2003; the entire contents of which are incorporated herein by reference.

BACKGROUND OF THE INVENTION

1) Field of the Invention

The present invention relates to a technique for controlling an unfolding operation of an air bag based on a distance between a person seated in a vehicle and a predetermined point.

2) Description of the Related Art

It is a common practice to detect a distance between an object and a predetermined point, and use the detected distance as a parameter to control something. For instance, it is known to control spreading out of an air bag in case of a car accident based on the distance between a passenger and a predetermined point.

In an air bag system, when a vehicle collision is detected, a balloon is blown by a constant explosive power. Japanese Patent Application Laid-open No. 2001-213268 discloses a technology to detect a distance between a predetermined position (a position of forward side of an occupant) and an occupant in a seat in a vehicle, and then control unfolding of an air bag based on the distance so as to protect the occupant from being injured by the air bag. For instance, if the distance is short, the air bag is made to unfold with weaker force for the safety of the occupant.

In Japanese Patent Application Laid-open No. 2001-213268, a spot beam light is irradiated to the occupant to acquire an image of the occupant. Based on the image, a distance between the occupant and the predetermined position is detected to judge the occupant position. Thus, it is possible to detect a distance between a part of the body of the occupant, which is irradiated by the spot beam light, and the predetermined position. However, although it is possible to detect a distance between a predetermined part of the body of the occupant and a predetermined position, it is impossible to detect a distance between the other parts of the body of the occupant and the predetermined position.

In other words, if the object can take various postures when seated on a vehicle, it may be possible to detect a distance between only a partial position of the occupant and the predetermined position; however, it is impossible to detect a distance between the other part of the object and the predetermined position. This may cause inappropriate control of the air bag system because of discordance between an actual position of the object and the detected distance.

SUMMARY OF THE INVENTION

It is an object of the present invention to solve at least the problems in the conventional technology.

A distance detecting apparatus according to an aspect of the present invention includes a light emitting unit that emits a light in a light emitting direction which is the direction to an object, the light having a distributed pattern in a predetermined direction; a photographing device that obtains an image of the object along a photographing direction; a holding mechanism that holds the light emitting unit and the photographing apparatus in such a relation that (a) the photographing direction is not in a plane that includes both the light emitting direction and the predetermined direction of the distributed pattern, and (b) the photographing direction is not parallel to the light emitting direction; and a distance deriving unit that derives a distance between the object and a predetermined position based on the image obtained by the photographing device.

An air bag system controlling apparatus according to another aspect of the present invention includes a light emitting unit that emits a light in a light emitting direction which is the direction to an object seating on a seat of a vehicle, the light having a distributed pattern in a predetermined direction; a photographing device that obtains an image of the object along a photographing direction; a holding mechanism that holds the light emitting unit and the photographing apparatus in such a relation that (a) the photographing direction is not in a plane that includes both the light emitting direction and the predetermined direction of the distributed pattern, and (b) the photographing direction is not parallel to the light emitting direction; a distance deriving unit that derives a distance between the object and a predetermined position based on the image obtained by the photographing device; and an air bag system controlling unit that controls an operation of an air bag based on the distance derived.

An air bag system controlling apparatus according to still another aspect of the present invention includes a light emitting unit that emits a light in a light emitting direction which is the direction to an object the light having a distributed pattern in a predetermined direction; a photographing device that obtains an image of the object along a photographing direction; a holding mechanism that holds the light emitting unit and the photographing apparatus, in such a relation that (a) the photographing direction is not in a plane that includes both the light emitting direction and the predetermined direction of the distributed pattern, and (b) the photographing direction is not parallel to the light emitting direction; a memory unit that stores a computer program that makes it possible to execute a function of deriving a distance between the object and a predetermined position based on the image obtained by the photographing device, and a function of controlling an operation of an air bag based on the distance derived; and a processor that can access the memory unit and execute the computer program.

A distance detecting apparatus according to still another aspect of the present invention includes a light emitting unit that emits a light in a light emitting direction which is the direction to an object, the light having a plurality of pattern lights that are parallel to each other; a photographing device that obtains an image of the object along a photographing direction; and a distance deriving unit that derives a distance between the object and a predetermined position based on an interval between the pattern lights in the image.

An airbag system controlling apparatus according to still another aspect of the present invention includes a light emitting unit that emits a light in a light emitting direction which is the direction to an object seated in a seat of a vehicle, the light having a plurality of pattern lights that are parallel to each other; a photographing device that obtains an image of the object along a photographing direction; a distance deriving unit that derives a distance between the object and a predetermined position based on an interval between at least two of the pattern lights in the image; and an air bag system controlling unit that controls an operation of an air bag based on the distance derived.

An airbag system controlling apparatus according to still another aspect of the present invention includes a light emitting unit that emits a light in a light emitting direction which is the direction to an object seated in a seat of a vehicle, the light having a plurality of pattern lights that are parallel to each other; a photographing device that obtains an image of the object along a photographing direction; a memory that stores a computer program that makes it possible to execute a function of deriving a distance between the object and a predetermined position based on an interval between at least two of the pattern lights in the image obtained by the photographing device, and a function of controlling an operation of an air bag based on the distance derived; and a processor that can access the memory unit and execute the computer program.

A method of detecting a distance according to still another aspect of the present invention includes emitting light in a light emitting direction to thereby irradiate an object, the light being having a distributed pattern in a predetermined direction; obtaining an image of the object along a photographing direction, in such a manner that (a) the photographing direction is not in a plane that includes both the light emitting direction and the predetermined direction of the distributed pattern and (b) the photographing direction is not parallel to the light emitting direction; and deriving a distance between the object and a predetermined position based on a position of the pattern light in the image.

A method of detecting a distance according to still another aspect of the present invention includes emitting light in a light emitting direction to thereby irradiate an object, the light having a plurality of pattern lights that are parallel to each other; obtaining an image of the object along a photographing direction; and deriving a distance between the object and a predetermined position based on an interval between the pattern lights in the image.

BRIEF DESCRIPTION OF THE DRAWINGS

FIG. 9 illustrates a table that stores a distance and a position of the reflected light, in a correlated form;

FIG. 28 illustrates another example of how reflected light is extracted from two images.

DETAILED DESCRIPTION

Exemplary embodiments of a distance detecting apparatus, an air bag system controlling apparatus, and a method of detecting a distance according to the present invention are described in detail below with reference to the accompanying drawings.

Figure 1:
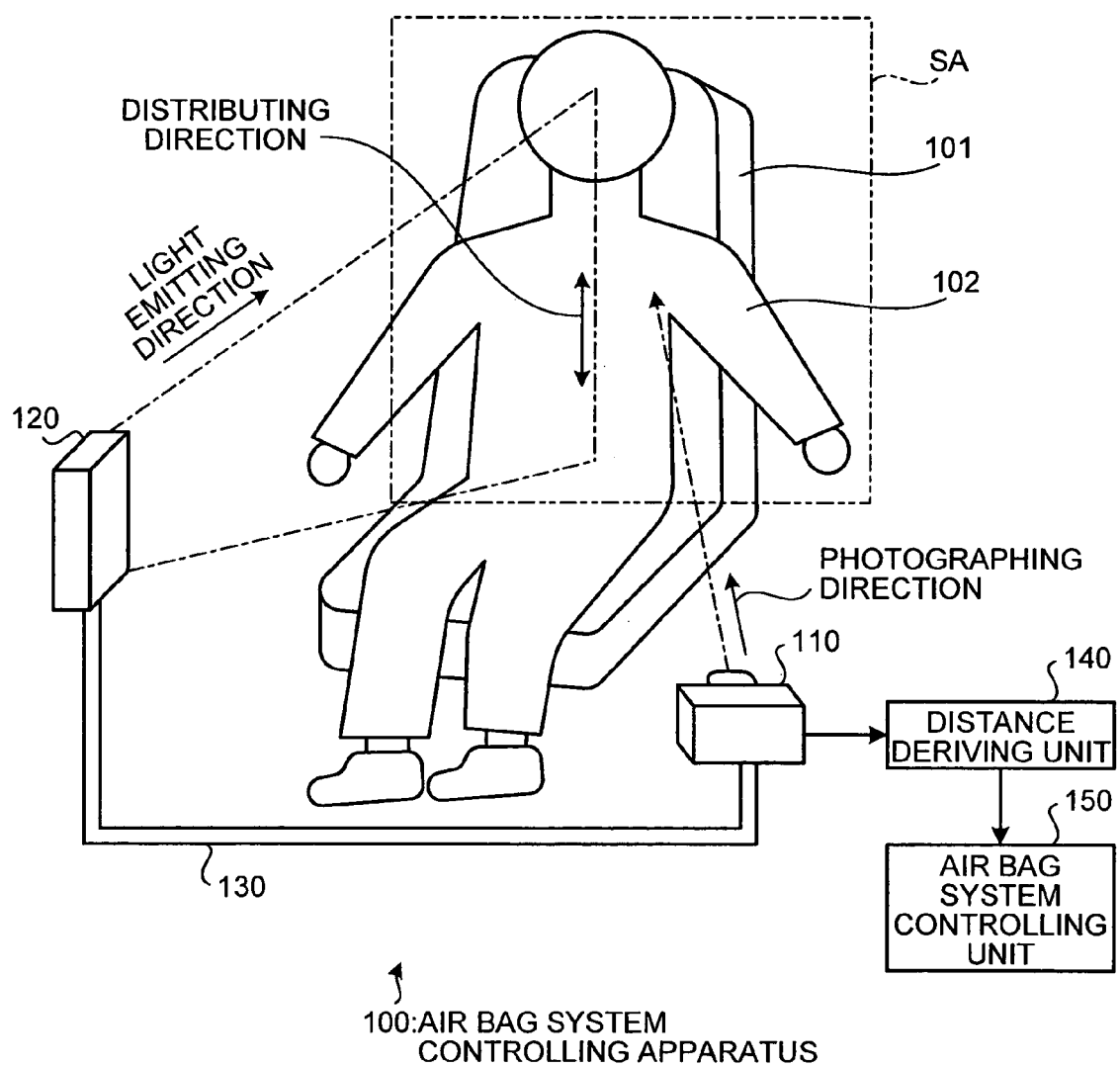
FIG. 1 illustrates a structure of an air bag system controlling apparatus according to a first embodiment of the present invention.

FIG. 1 illustrates a structure of an air bag system controlling apparatus according to a first embodiment of the present invention. The air bag system controlling apparatus 100 has a distance detecting function for detecting a distance. The air bag system controlling apparatus 100 includes a photographing apparatus 110, a light emitting unit 120, a holding mechanism 130, a distance deriving unit 140, and an air bag system controlling unit 150.

The photographing apparatus 110, such as a video camera, photographs in a region of infrared radiation. The photographing apparatus 110 is fixed and is held in a predetermined position by the holding mechanism 130 so that the photographing apparatus 110 photographs an upper body of an occupant (hereinafter, "object") 102 seated in a seat, in a predetermined direction (hereinafter, "photographing direction"), to obtain an image. The photographing direction is adjusted so that the object 102 is in a photographing region SA, which is inside of a frame illustrated in the figure with a two-dashed line.

The light emitting unit 120 emits light and irradiates the object 102. The light emitting unit 120 emits the light over an area from a diagonal forward position of the object 102 (front side in FIG. 1) to a center of the seat 101 (horizontal direction in FIG. 1). In other words, the light is emitted to a center of the object 102 (hereinafter, "light emitting direction").

The light emitting unit 120 emits infrared radiation so that the object 102 does not feel dazzled. The light emitting unit 120 includes an infrared emission diode as an emitting means in a steel frame having a slit.

The light emitting unit 120 emits a pattern light that distributes in a predetermined direction. A direction of the pattern light is different from the light emitting direction. The pattern light extends in the form of straight line and is perpendicular to the light emitting direction.

Figure 2:
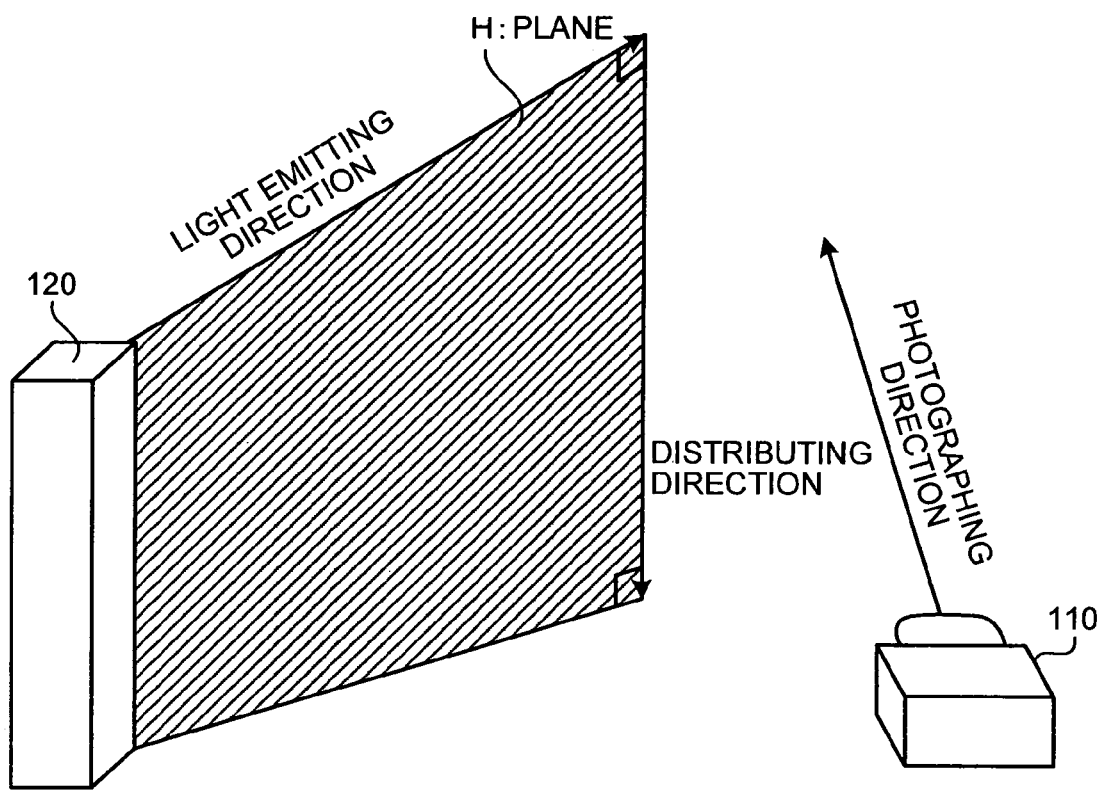
FIG. 2 illustrates positions of a light emitting unit and a photographing apparatus.

FIG. 2 illustrates positions of a light emitting unit and a photographing apparatus. The holding mechanism 130 holds and fixes the photographing apparatus 110 and the light emitting unit 120 so that the object is within the photographing region SA.

Such positions can be achieved if the following two conditions are fulfilled.

The first condition is that the photographing direction of the photographing apparatus 110 is not be parallel to the light emitting direction of the light emitting unit 120.

The second condition is that the photographing direction of the photographing apparatus 110 is not in a plane H that includes the light emitting direction and the pattern light.

As illustrated in FIG. 1, the holding mechanism 130 may include a frame that has two ends and that has a shape of a horseshoe, so that the ends of the frame may support the photographing apparatus 110 and the light emitting unit 120. Other structures may be used as the holding mechanism 130 as long as both the photographing apparatus 110 and the light emitting unit 120 are held at positions fulfilling the above-mentioned two conditions. For example, the photographing apparatus 110 and the light emitting unit 120 may be held respectively by different frames that are fixed to a material in a vehicle, such as a dashboard.

The distance deriving unit 140 derives a distance between the object 102 and a predetermined position (for example, a front part of the dashboard) based on the image obtained by the photographing apparatus 110. More precisely, the light reflected from the object 102 extends vertically in the form of a straight line in the image (hereinafter, "line pattern in the image"). A position of the line pattern is identified from the image, and then the distance between the predetermined position and the object 102 is derived using the position of the line pattern in the image.

A principle for deriving the distance between a position of the object 102 that is identified based on the position of the line pattern in the image, and the predetermined position, will be explained next with reference to FIG. 3, FIG. 4, and FIG. 5. For the sake of convenience, it is assumed that the object 102 is in a plane.

Figure 3:
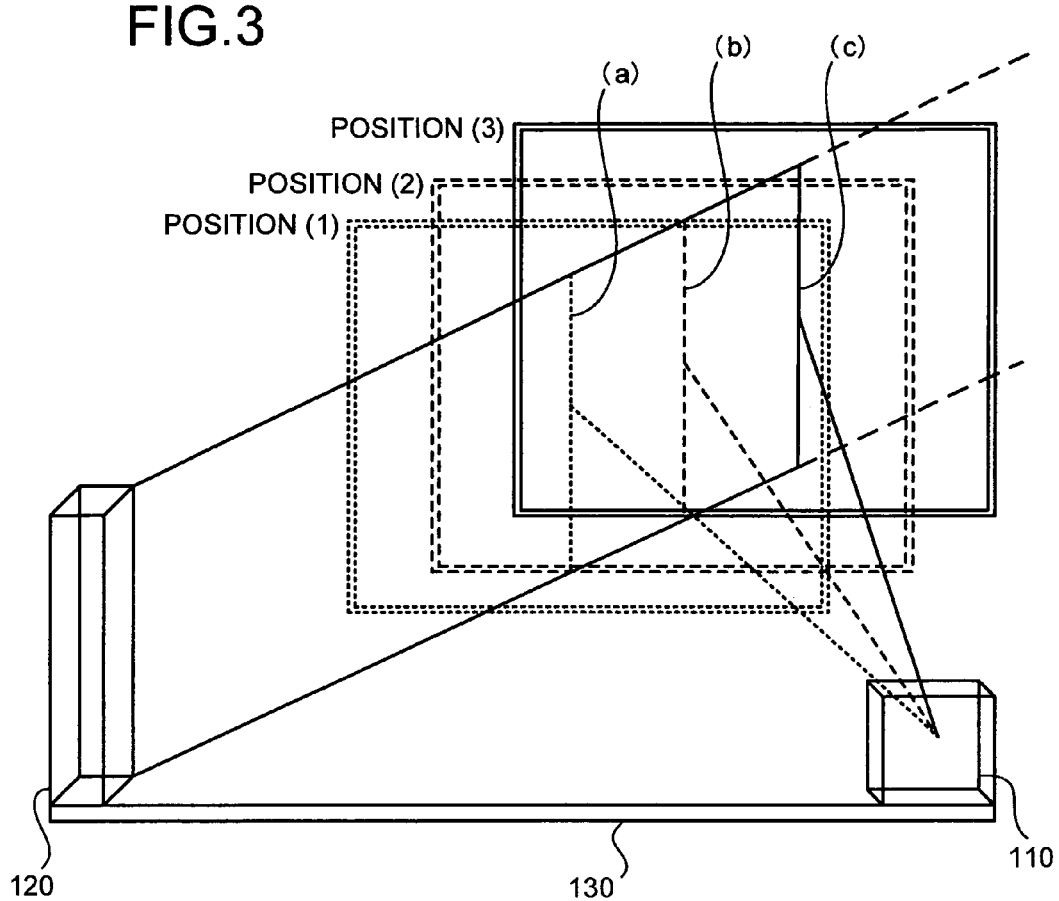
FIG. 3 illustrates a relation between a position of an object and a position of a line pattern in an image.

FIG. 3 illustrates a relation between a position of the object and a position of the line pattern in the image. When the object is in a nearest position (1), a line pattern in the image (a) is located in the left side as viewed from the photographing apparatus 110 (front side in FIG. 3). When the object is in the farthest position (3), a line pattern in the image (c) is located in the right side as viewed from the photographing apparatus 110. When the object is in a position (2) that is between the position (1) and the position (3), a line pattern in the image (b) is located in between the position (a) and the position (c) as viewed from the photographing apparatus 110.

Figure 4:
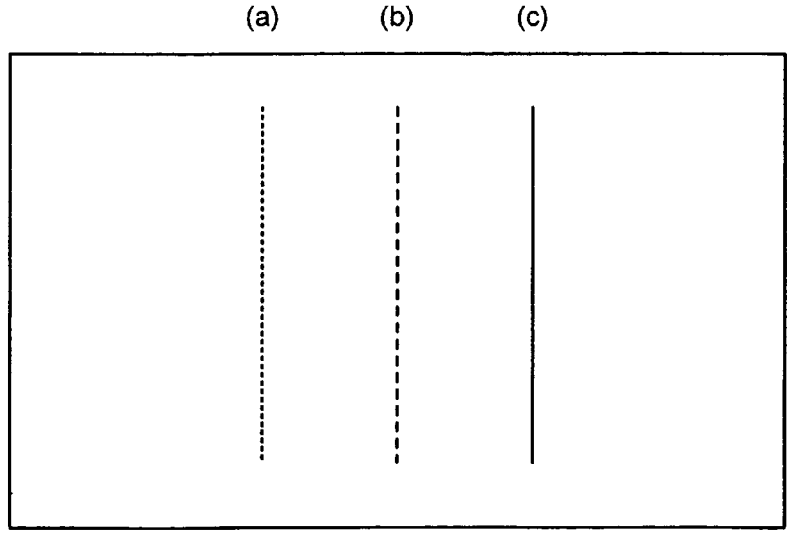
FIG. 4 illustrates positions of the line pattern in the image.

FIG. 4 illustrates positions of the line pattern in the image. As illustrated in FIG. 3 and FIG. 4, the greater the distance between the object and the predetermined position is, the more the line pattern in the image is located to right side in the image.

Figure 5:
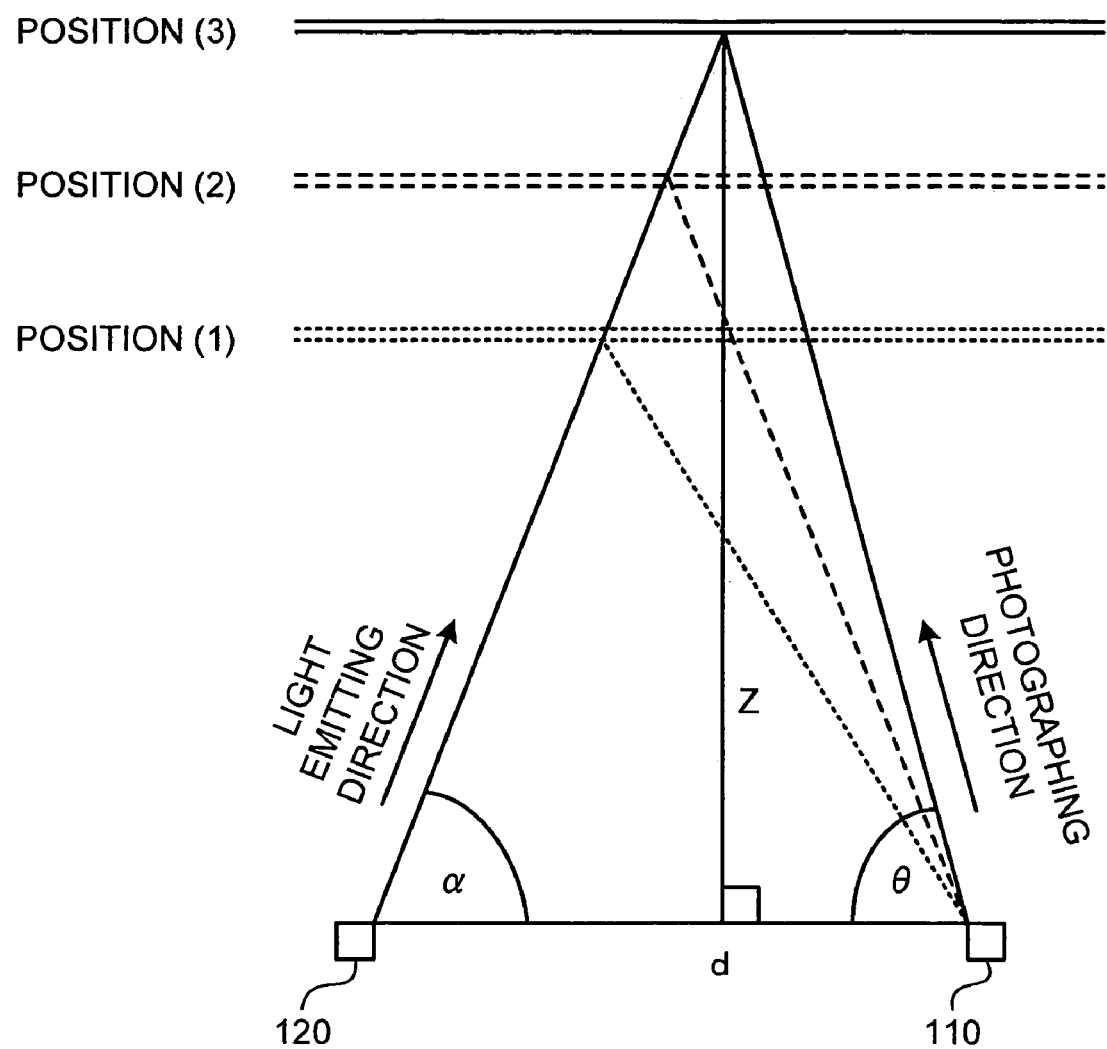
FIG. 5 illustrates a principle for deriving a distance between the object and a predetermined position.

FIG. 5 illustrates a principle for deriving a distance between the object and a predetermined position. If a line that connects the light emitting unit 120 and the photographing apparatus 110 is perpendicular to a distance detecting direction, a distance Z can be represented by an equation (1):

$$Z = \frac{d \cdot \tan\alpha \cdot \tan\theta}{\tan\alpha + \tan\theta} \quad (1)$$

where d is a distance between the photographing apparatus 110 and the light emitting unit 120, and the value of d is known because the photographing apparatus 110 and the light emitting unit 120 are fixed. An angle $\alpha$ is known from a position of the light emitting unit 120 and the light emitting direction. An angle $\theta$ has a mutual relationship with the position of the line pattern in the image so that the angle $\theta$ can be derived from the line pattern in the image in FIG. 4. Thus, the distance Z can be represented by the equation (1).

The distance Z may be derived from a distance between the object 102 and a line connecting the light emitting unit 120 and the photographing apparatus 110. However, any other approach that uses a distance between the object 102 and a different line may be used. In such a case, a position of the line is known from the positions of the photographing apparatus 110 and the light emitting unit 120, and also a distance between another line and the predetermined position, such as a front part of the dashboard, is known. Therefore, a distance between the object 102 and the predetermined position may be derived from the distance Z and the other known distances.

Figure 6:
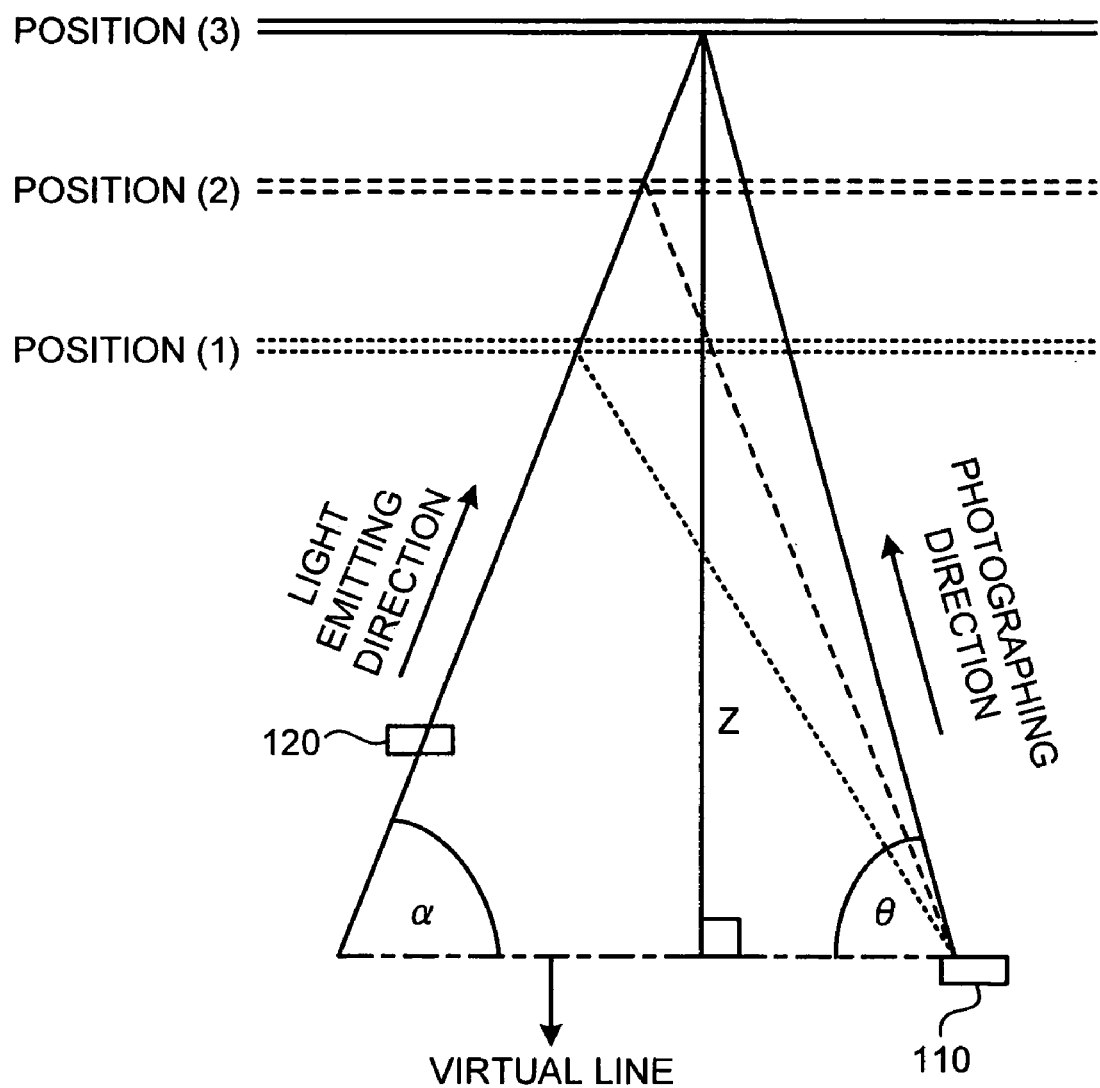
FIG. 6 illustrates another principle for deriving a distance between the object and the predetermined position.

FIG. 6 illustrates another principle for deriving a distance between the object and the predetermined position. When the line connecting the photographing apparatus 110 and the light emitting unit 120 is not perpendicular to the distance detecting direction, a distance between a virtual line and the object can be derived, where the virtual line may be perpendicular to the distance detecting direction.

Thus, based on the position of the line pattern in the image, the distance deriving unit 140 can derive a distance between the object 102 and the predetermined position, such as a front of the dashboard.

Figure 7:
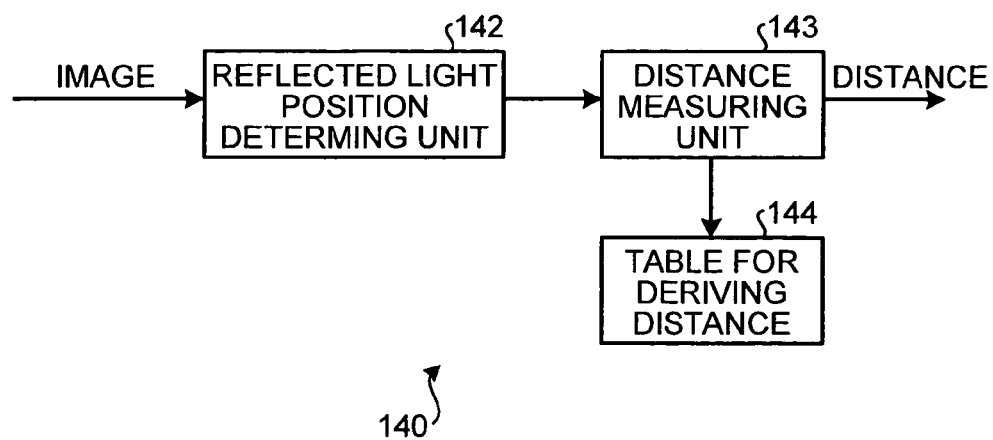
FIG. 7 is a block diagram of a distance deriving unit.

FIG. 7 is a block diagram of the distance deriving unit. The distance deriving unit includes a reflected light position determining unit 142, a distance measuring unit 143, and a table for deriving distance 144. The reflected light position determining unit 142 identifies the position of the line pattern in the image, which is in the form of straight line. If the object 102 is in a plane that is perpendicular to the distance detecting direction, the line pattern in the image is in the form of straight line and is brighter (hereinafter, "high-luminance part") as compared to other parts in the image.

However, the object 102 may not always be in a plane and may have various postures. Consequently, the line pattern in the image is not always in the form of a straight line. Moreover, when a vehicle collides, the object 102, who is a person of average build, rarely inclines greatly due to vibrations of the collision. Therefore, the line pattern in the image may be nearly in the form of straight line although there may be minor curves. Such a form having curves may be assumed to be a straight line.

It is possible to identify the high-luminance part by dividing the image horizontally into numerous lines and extracting coordinates of an image element having the highest high-luminance. For the purpose of identifying the high-luminance part with more accuracy, an application such as a primary differential filter of horizontal direction may be applied to the image so as to calculate a spatial change of the luminance and an absolute value. A digital filter such as a Sobel 3×3 filter $$\begin{pmatrix} -1 & 0 & 1 \\ -2 & 0 & 2 \\ -1 & 0 & 1 \end{pmatrix}$$

may also be used.

Any other filtering method that relatively enhances the high-luminance part in the form of straight line may be used. After the filtering, the high-luminance part is identified by extracting an image element of the high-luminance part from the image. For example, a 3×3 secondary differential filter such as a laplacian filter $$\begin{pmatrix} 0 & 1 & 0 \\ 1 & -4 & 1 \\ 0 & 1 & 0 \end{pmatrix}$$

may be used.

Figure 8:
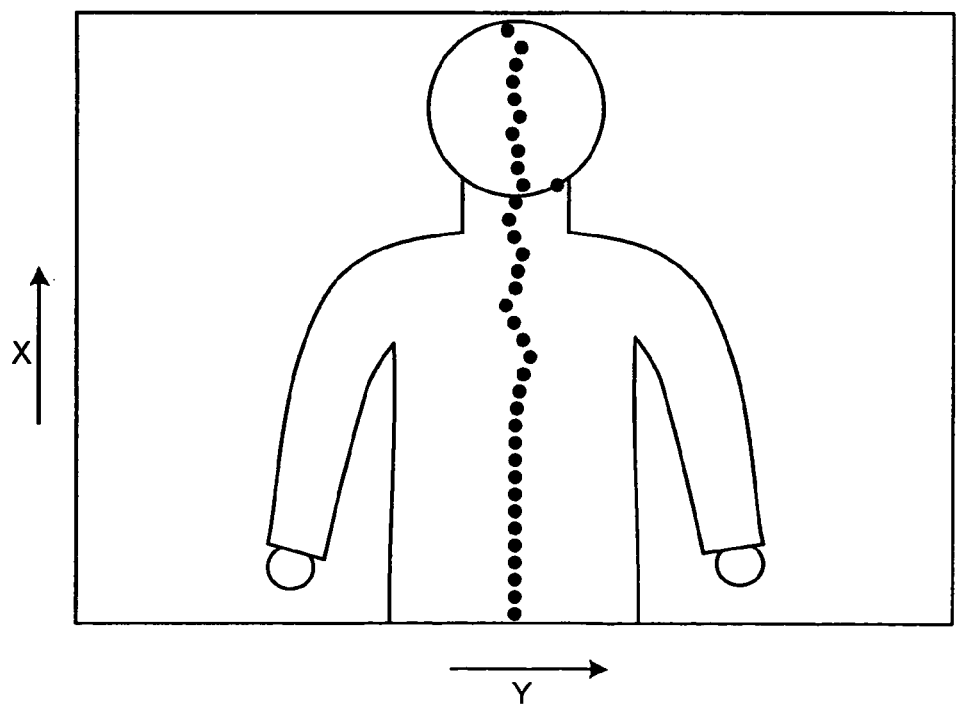
FIG. 8 illustrates a position of reflected light in the image.

When the laplacian filter is applied to enhance the high-luminance part, an image I(x, y) is generated. The reflected light position determining unit 142 identifies the position of the line pattern in the image from the image I(x, y) using an equation (2) given below. That is, as illustrated in FIG. 8, distribution of the luminance part in each horizontal line is detected, a horizontal coordinate of the highest luminance part (illustrated as black circle in FIG. 8) is selected, and then a function P(y), which represents the position of the line pattern in the image as a parameter of vertical coordinate, is generated. When a luminance value is I(x, y), then P(y) is represented by the equation (2):

$$P(y) = \{x \mid \max_{x} = I(x, y)\} \tag{2}$$

If the object 102 is in a plane, and if a normal vector of the plane containing the object 102 and a normal vector of the plane H containing the light emitting direction and the light distributing direction are coplanar, then the high-luminance pattern in the image I(x, y) is a straight line perpendicular to the object 102. However, in practice, the high-luminance pattern does not exactly form a straight line because the object 102 is not in a plane and also the object 102 may have various postures. Thus, the line pattern in the image is not in the form of straight line, and therefore, P(y) may have various values corresponding to a vertical coordinate.

The reflected light position determining unit 142 identifies from the high-luminance part, one of the positions of the line pattern in the image as Ph (hereinafter, "position Ph"). The reflected light determining unit 142 identifies the shortest distance as the position of the line pattern in the image in P(y). In other words, as described with reference to FIG. 2, FIG. 3, and FIG. 4, the more the line pattern in the image is located in the left side, the shorter a distance between the object 102 and the predetermined position is. Therefore, a left-most position of the line pattern in the image is chosen from P(y) as Ph. That is, the position Ph is derived using an equation (3):

$$Ph = \min P(y) \tag{3}$$

Thus, it is possible to detect an appropriate distance between the object 102 and the predetermined position, such as a front part of a dashboard, even if the object 102 leans, or a face or arms of the object 102 are closer to the dashboard. In other words, the nearest part of the body of the object 102 can be detected. Therefore, the air bag system controlling unit 150 can be controlled appropriately.

The distance measuring unit 143 derives a distance between the object 102 and the predetermined position based on the position Ph. A principle for deriving the distance based on the position Ph is described above with reference to FIG. 3, FIG. 4, and FIG. 5. It may be possible to derive the distance using the formula (1). In this embodiment, use of a table for deriving a distance 144 reduces the calculation load of the distance measuring unit 143.

As illustrated in FIG. 9, the table for deriving a distance 144 stores, in correlated form, the position Ph that is pre-calculated and a distance corresponding to the value of the position Ph. The distance measuring unit 143 acquires the distance corresponding to the position Ph from the table for deriving a distance 144. Then, the distance measuring unit 143 outputs the distance to the air bag system controlling unit 150 illustrated in FIG. 1.

The air bag system controlling unit 150 controls an operation of the air bag system based on the distance supplied by the distance deriving unit 140 when the operation is required. For example, when a vehicle equipped with the air bag system controlling apparatus 100 collides and a sensor (not shown) detects the collision, the air bag system controlling unit 150 controls the operation of an air bag system.

More precisely, the air bag system controlling unit 150 controls an explosive power of the air bag system based on the distance. A plurality of packets that include appropriate amount of explosive material are equipped, and then the number of packets to be exploded is specified based on the distance. For example, when the distance is longer, the air bag system controlling unit 150 controls the explosive power in such a way that the air bag expands more. For example, when the distance is between 0 cm to 30 cm, the explosive power is small, and only one packet is exploded. When the distance is between 30 cm to 40 cm, the explosive power is moderate, and two packets are exploded. When the distance is more than 40 cm, the explosive power is large, and three packets are exploded.

Figure 10:
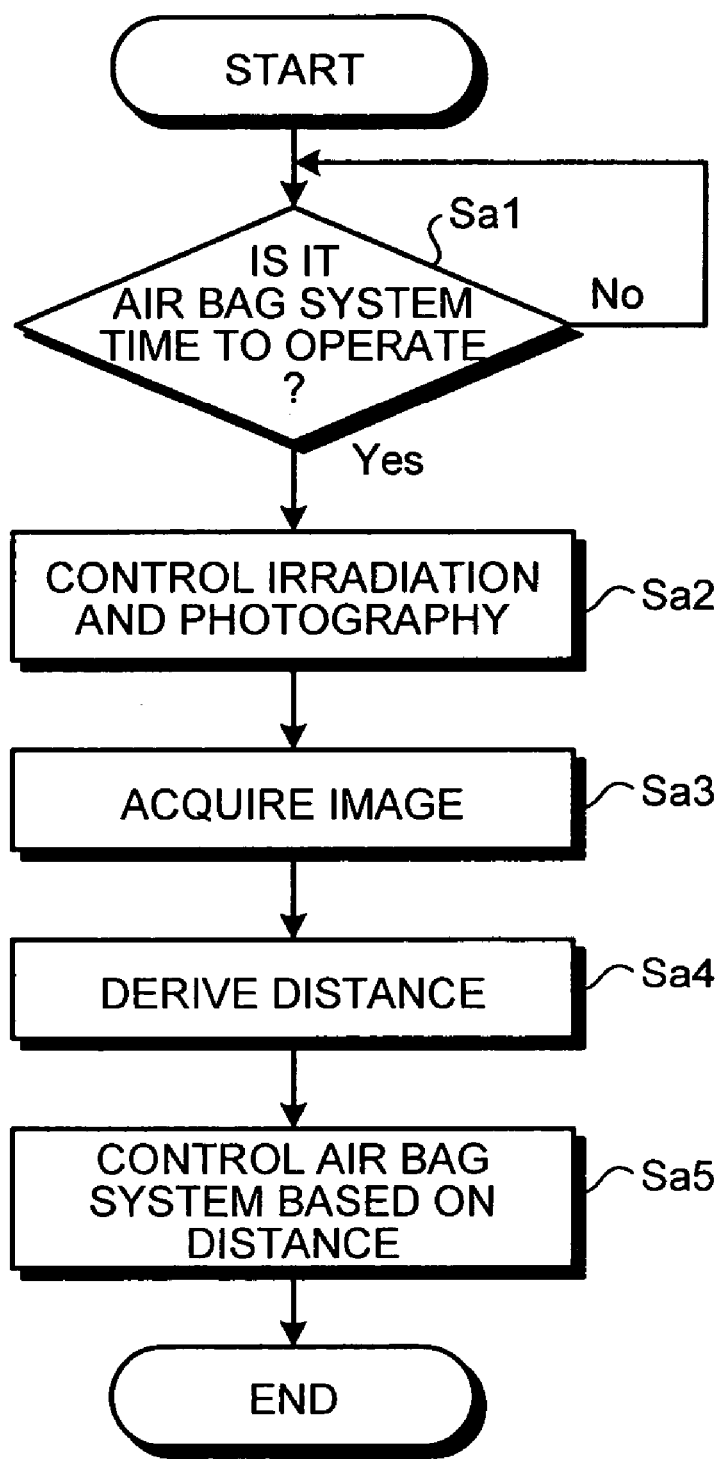
FIG. 10 is a flowchart of a process executed by an air bag system controlling unit.

An operation of the air bag system controlling unit 150 is explained below with reference to the flowchart in FIG. 10. The air bag system controlling unit 150 decides whether it is time to operate the air bag system (step Sa1).

If the operation of the air bag system is required, the air bag system controlling unit 150 provides a control so that the light emitting unit 120 and the photographing apparatus 110 operate (step Sa2).

While the light emitting unit 120 is emitting light, the photographing apparatus 110 photographs the object 102, and the distance deriving unit 140 acquires the image of the object 102 (step Sa3). Based on the image, the distance deriving unit 140 derives a distance between the object 102 and the predetermined position (step Sa4).

The distance derived by the distance deriving unit 140 is supplied to the air bag system controlling unit 150 that controls the air bag system based on the distance (step Sa5).

Thus, the air bag system controlling apparatus 100 can control an explosive power of the air bag system based on the distance between the predetermined position (a front part of the dashboard) and the object so as to provide an appropriate operation of the air bag corresponding to a posture of the object on the seat 101. Therefore, it is possible to reduce inappropriate operation of the air bag, such as exploding with a big power when the object is near the dashboard.

Thus, in the first embodiment, for controlling the air bag, the light emitting unit 120 emits light and irradiates the object 102, the distance deriving unit 140 identifies the position of the line pattern in the image, which includes an image of an upper body of the object 102 and derives the distance.

Further, because the light distributing direction is a straight vertical direction, the whole of the upper body of the object 102 can be irradiated. Thus, a distance is derived by identifying the position of the line pattern in the image. Even if the object has various postures, a distance between each part of the upper body of the object and the predetermined position is derived. An appropriate operation of the air bag is possible, because the shortest distance between the object and the predetermined position is considered.

Moreover, the air bag system controlling unit 150 controls the light emitting unit 120 and the photographing apparatus 110 if an operation of the air bag is necessary. As the light emitting unit 120 does not emit light to irradiate the object 102 except when the operation of the air bag required, the object does not feel uncomfortable, or feel dazzled.

When the light emitting unit 120 and the photographing apparatus 110 operate, the distance must be derived quickly, because the air bag must be operated immediately. This can be achieved, because the distance measuring unit 143 derives a distance by referring to the table for deriving a distance 144, which saves time.

Figure 11:
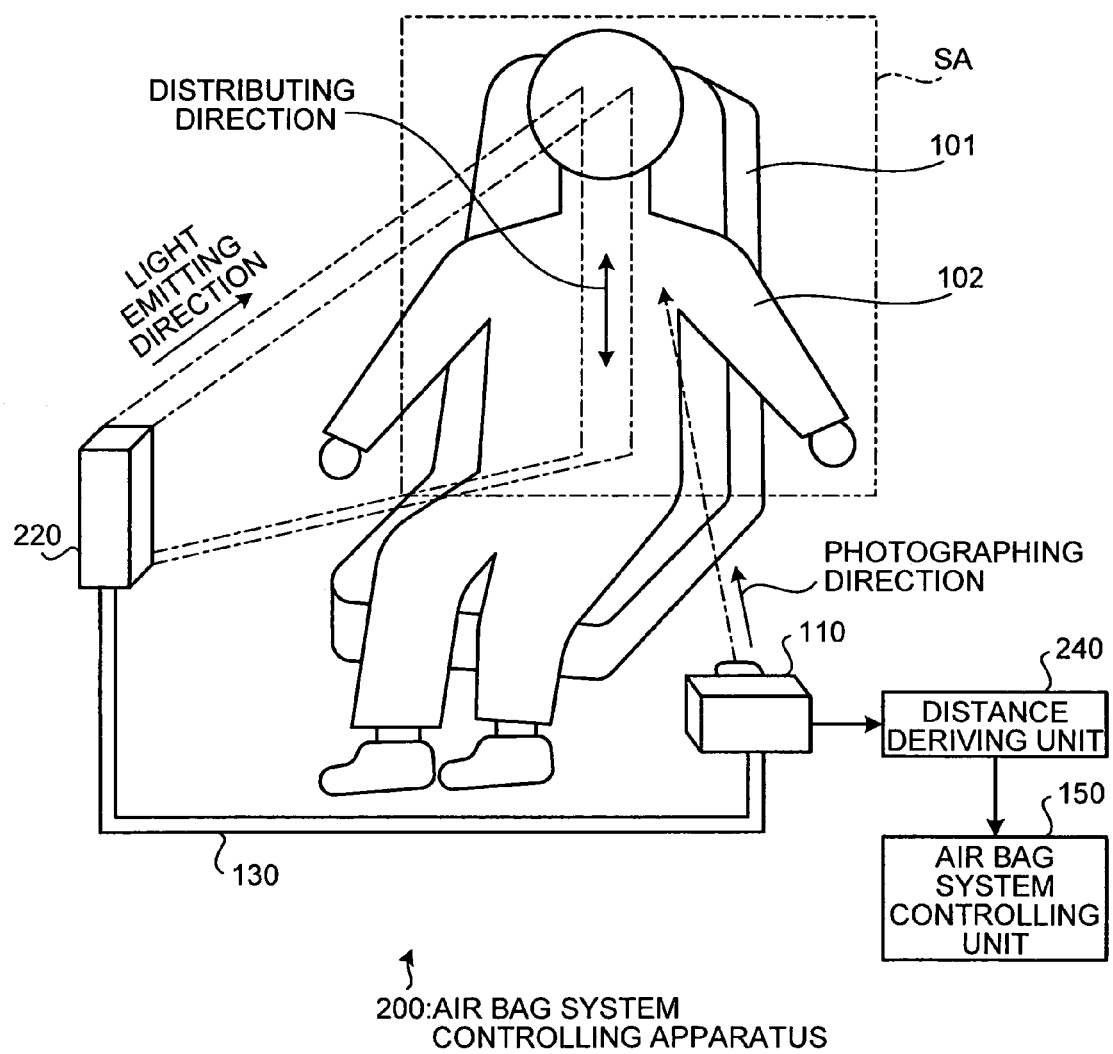
FIG. 11 illustrates a structure of the air bag system controlling apparatus according to a second embodiment.

FIG. 11 illustrates a structure of an air bag system controlling apparatus according to a second embodiment. The air bag system controlling apparatus 200 according to the second embodiment is different from that of the first embodiment in the following two ways. First, in the air bag system controlling apparatus 200, a light emitting unit 220 emits a plurality of lights toward the object 102 (2 lights are shown in the figure). Second, the distance deriving unit 240 derives the distance based on positions of plurality of reflected lights in an image photographed by the photographing apparatus 110. In the second embodiment, the structural elements that have the same or similar structures or the same or similar functions have been provided with the same reference numerals as those in the first embodiment.

The light emitting unit 220 emits two lights in a direction identical to the light emitting direction in the first embodiment. These lights are in the form of straight lines and are positioned in the same distributing direction as in the first embodiment. The light emitting unit 220 may be a steel case that includes an infrared lamp, such as an infrared emitting diode, as an emitting means, and that has a plurality of vertical slits. However, a plurality of steel cases that irradiate one light each may be provided.

Figure 12:
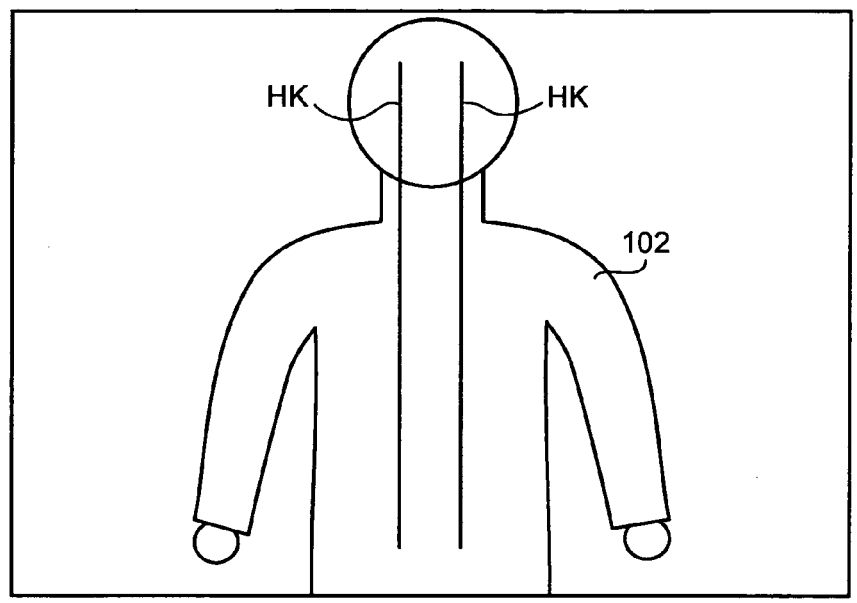
FIG. 12 illustrates an image when the object is irradiated by light that includes a plurality of straight lines.

FIG. 12 illustrates an example of an image obtained by the photographing apparatus 110. The image contains the object 102 irradiated by the light emitting unit 220. The image includes two reflected lights HK in the form of straight lines that extend in a vertical direction. The positions of the reflected lights change as a position of the object 102 changes.

Figure 13:
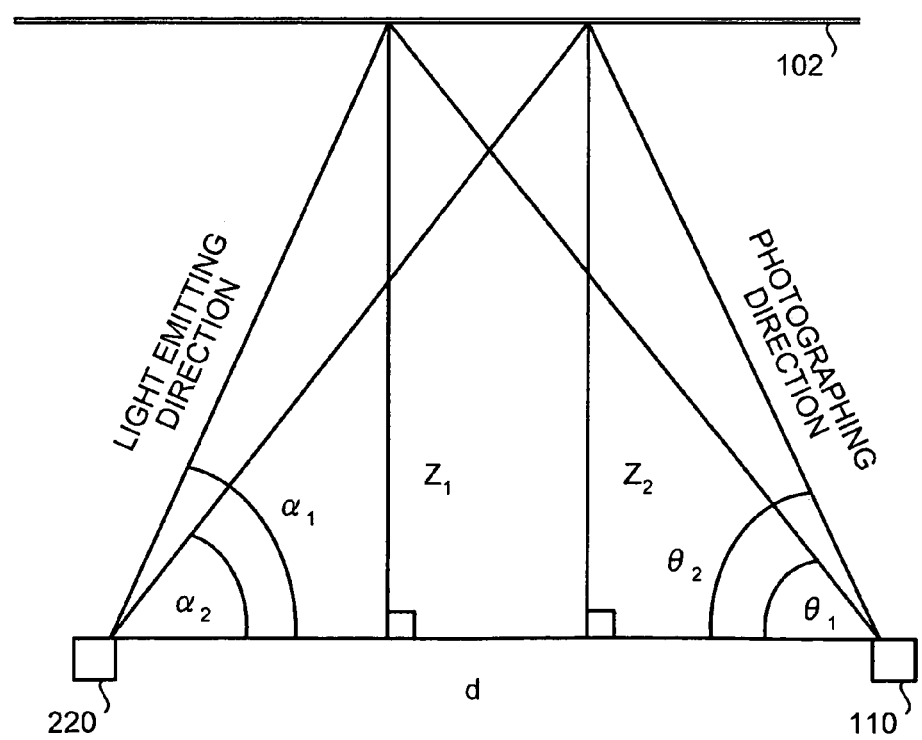
FIG. 13 illustrates a principle for deriving a distance between the object and the predetermined position.

FIG. 13 illustrates a principle for deriving a distance between the object and the predetermined position. If a line connecting the light emitting unit 220 and the photographing apparatus 110 is perpendicular to a distance detecting direction, a distance Z1 and a distance Z2 can be represented by equations (4) and (5), based on the same distance detecting principle as in the first embodiment. The distance Z1 and the distance Z2 are a distance between the line connecting the light emitting unit 220 and the photographing apparatus 110, and the object 102.

$$Z_1 = \frac{d \cdot \tan\alpha_1 \cdot \tan\theta_1}{\tan\alpha_1 + \tan\theta_1} \quad (4)$$

$$Z_2 = \frac{d \cdot \tan\alpha_2 \cdot \tan\theta_2}{\tan\alpha_2 + \tan\theta_2} \quad (5)$$

An angle $\alpha_1$ and an angle $\alpha_2$ are known from a position of the light emitting unit 220 and the light emitting direction. An angle $\theta_1$ and an angle $\theta_2$ have a mutual relationship with a position of the reflected light in the image. Therefore, the angle $\theta_1$ and the angle $\theta_2$ can be respectively derived from the position of the reflected light. In other words, the distance Z1 and the distance Z2 can be represented by the equations (4) and (5).

If the line between the light emitting unit 220 and the photographing apparatus 110 is not perpendicular to the distance detecting direction, a distance between a virtual line and the object 102 can be derived, as illustrated in FIG. 6. Accordingly, the virtual line is defined to be perpendicular to the distance detecting direction.

The distance deriving unit 240 specifies positions of the reflected light Ph1 and Ph2 by the same procedure used by the distance deriving unit 140 in the first embodiment. As a result, the distance Z1 and the distance Z2 can be represented by the equations (4) and (5), respectively, based on the positions of the reflected light Ph1 and Ph2.

If the object 102 is in a plane that is perpendicular to the distance deriving direction, the distance Z1 is equal to the distance Z2 in theory. However, the object 102 may not be in a plane and is likely to be slanted depending on posture, and hence, the distance Z1 is not equal to the distance Z2. Therefore, the smaller value of the two is chosen as the distance and is output to the air bag system controlling unit 150.

The air bag system controlling unit 150 provides control to expand an air bag by an explosive power that depends on the distance obtained from the distance deriving unit 240.

In the air bag system controlling apparatus 200 according to the second embodiment, two lights are irradiated towards an upper body of the object 102 and the distance is derived based on positions of the light reflected from two lights, thereby enabling detection of the distance of different parts of the object, even if the object 102 has various postures.

By detecting the shortest distance from the part of the body, it is possible to control the explosive power of the air bag.

Thus, expanding the air bag by an excessive explosive power can be avoided. In such a manner, it is possible to control the air bag appropriately according to the posture of the object when a collision occurs.

In the second embodiment, although the smaller value from the distance Z1 or the distance Z2 is chosen, an average of the distance Z1 and Z2, or one of the distances Z1 and Z2 may be used.

Figure 14:
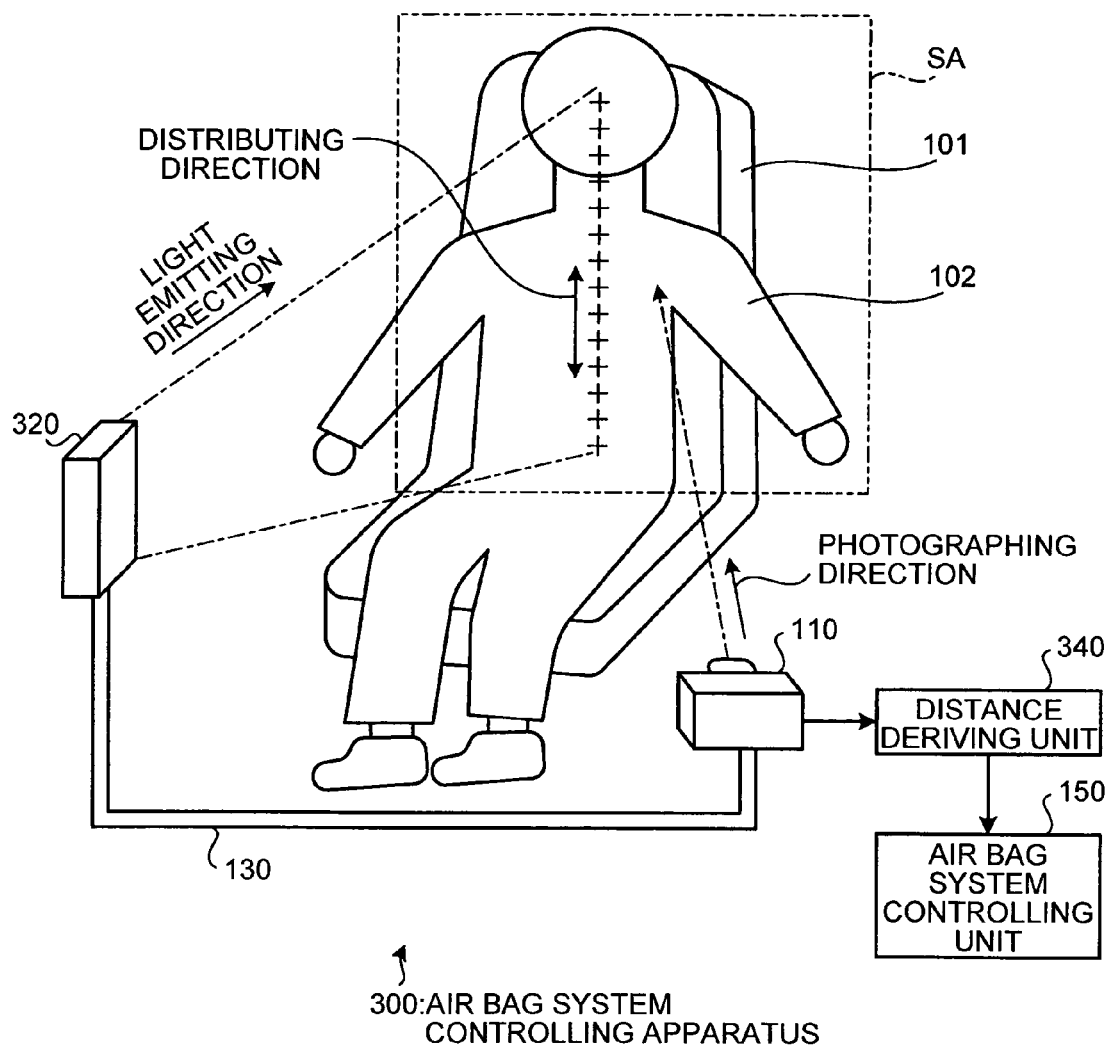
FIG. 14 illustrates a structure of the air bag system controlling apparatus according to a third embodiment.

FIG. 14 illustrates a structure of an air bag system controlling apparatus according to a third embodiment. In an air bag system controlling apparatus 300, a light emitting unit 320 emits light, which has different form from that of the light emitting unit 120 of the first embodiment. In the third embodiment, the structural elements that have the same or similar structures, or the same or similar functions have been provided with the same reference numerals as those in the first embodiment.

The light emitting unit 320 emits light in the same direction as that of the light emitting unit 120. However, the light distributes in a dispersed manner, not in the form of a straight line. In other words, many predetermined pattern lights are emitted so as to be disposed in a vertical direction.

Figure 15:
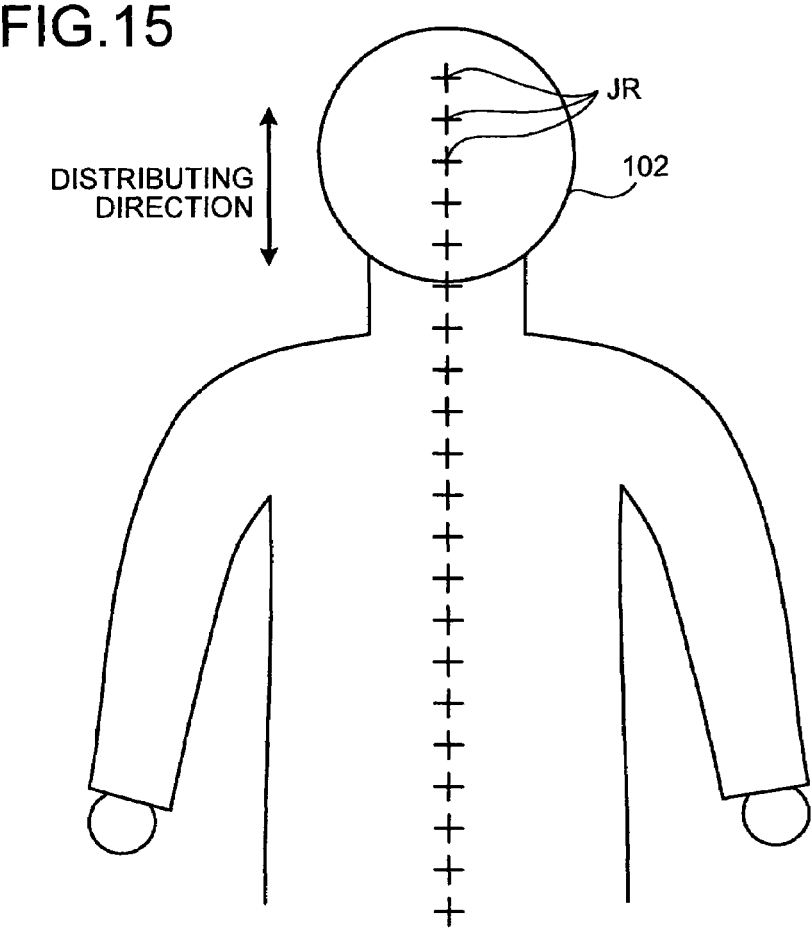
FIG. 15 illustrates an image when the object is irradiated by light that includes cross marks.

The pattern lights may have any pattern. However, it is preferable to emit pattern lights that can be easily distinguished from natural light. For example, as illustrated in FIG. 15, a pattern light that includes a plurality of cross marks JR is emitted for irradiating the object 102.

The light emitting unit 320 may be a steel case, which includes as an emitting means an infrared lamp, such as an infrared emitting diode, and has plurality of slits arranged vertically, each forming a cross mark.

The image includes many cross marks because the light is emitted in the form of cross marks. The position of these cross marks varies as a position of the object 102 changes.

A distance deriving unit 340 derives a distance between a predetermined position and the object 102 based on positions of the cross marks. The procedure for deriving the distance from the position of the cross mark Ph is the same as that in the first embodiment. However, a procedure to identify the position of the cross marks is different.

The distance deriving unit 340 recognizes and processes image data supplied by the photographing apparatus 110, and then recognizes and identifies a high-luminance part from the cross marks in the image. As the light includes cross marks, which are almost non-existent in nature, it is possible to reduce a false detection.

Figure 16:
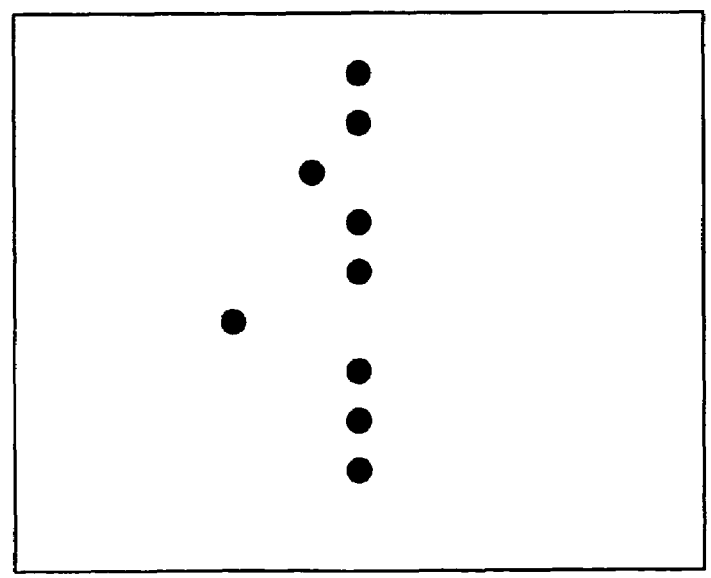
FIG. 16 illustrates distribution of a high-luminance part in the image when the object is irradiated by light in the form of a straight line.

More precisely, in a case when the object is irradiated with light in the form of straight lines, high-luminance parts are distributed in the image as illustrated in FIG. 16. If the object is in a plane, these black circles should be distributed in the vertical direction as a straight line. However, this image may include other lights. For example, if the object 102 wears glasses, some other lights are reflected on the glasses. Also, in some cases, these high-luminance parts may be dispersed widely noise.

As described above, when the object is irradiated by light in the form of a straight line, the high-luminous parts do not always represent an accurate position of the cross mark because of the other lights or noise. In such a case, the accuracy of the distance reduces.

On the other hand, when the object is irradiated by light that includes cross marks, and the high-luminance parts in the image are identified, the false detection of the other lights can be reduced. Furthermore, detection of the identified position is unlikely to be affected by noise. Consequently, the position of the reflected light can be derived accurately.

The distance deriving unit 340 identifies the positions Ph of the cross marks from these positions Ph, for example, a center of the cross marks, and derives a distance between the object 102 and the predetermined position such as a front part of a dashboard, based on the positions Ph.

The air bag system controlling unit 150 controls an operation of the air bag based on the distance derived by the distance deriving unit 340.

In the air bag system controlling apparatus 300, the position of the reflected light from the object 102 is identified using the pattern light that includes cross marks. Because such light does not exist in nature, the distance is derived more accurately.

These pattern lights are irradiated in the vertical direction on the whole of the upper body of the object 102 and the distance is derived based on the position of the cross marks. Therefore, it is possible to detect the distance up to different parts of the object, even if the object 102 has various postures.

In the air bag system controlling apparatus 300, the distances up to different parts of the object 102 are detected, and then the smallest value among these distances is chosen. As a result, it is possible to control the explosive power of the air bag appropriately.

Figure 17:
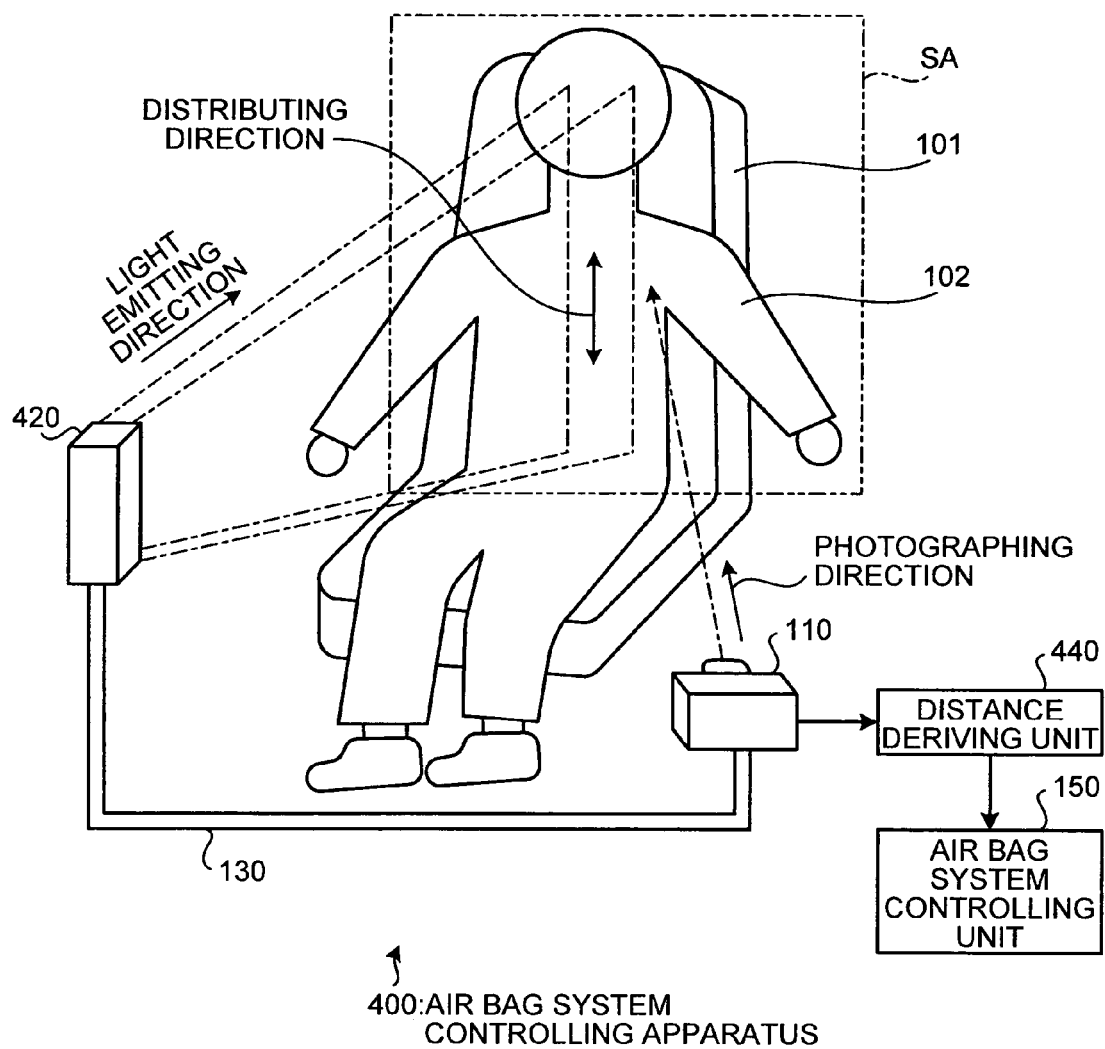
FIG. 17 illustrates a structure of the air bag system controlling apparatus according to a fourth embodiment.

An air bag system controlling apparatus according to a fourth embodiment is explained below with reference to FIG. 17. An air bag system controlling apparatus 400 in the fourth embodiment is different from that in the first embodiment in the following two ways. First, in the air bag system controlling apparatus 400, a light emitting unit 420 emits a plurality of lights towards the object 102. Second, the distance deriving unit 440 derives the distance based on the positions of two lights reflected from the object. In the fourth embodiment, the structural elements that have the same or similar structures, or the same or similar functions have been provided with the same reference numerals as those in the first embodiment.

Figure 18:
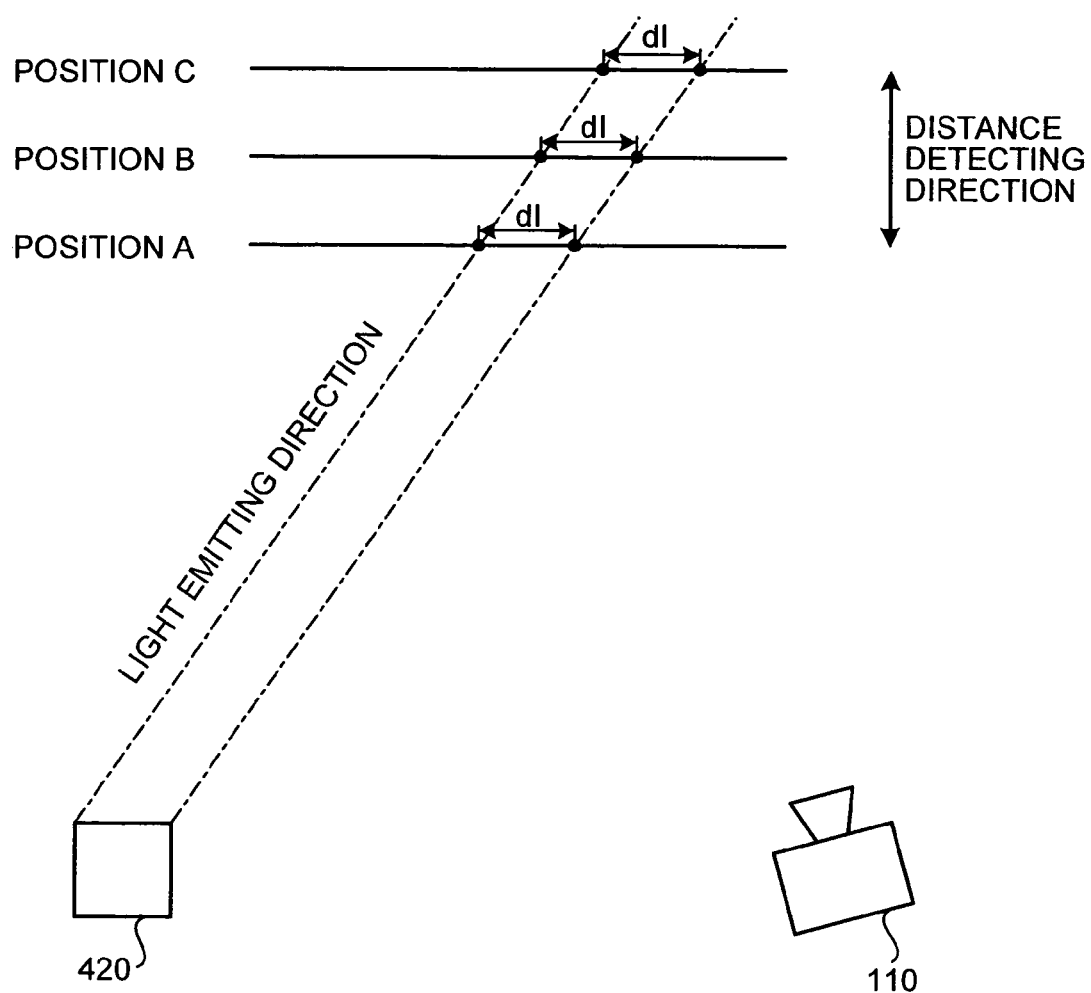
FIG. 18 illustrates a relation between a position of an object and positions of irradiating lights.

The light emitting unit 420 shown in FIG. 18 emits two lights in the same light emitting direction as that in the first embodiment. These lights are in the form of straight lines that are positioned in the same distributing direction as in the first embodiment. Moreover, the lines are parallel to each other.

The light emitting unit 420 may be a steel case that includes an infrared lamp, such as an infrared emitting diode, as an emitting means. A plurality of units that emit one light each may be provided instead of one unit that emits a plurality of lights.

The photographing apparatus 110 photographs the upper body of the object 102, irradiated by the light emitting unit 420. The distance deriving unit 440 derives the distance between the object 102 and the predetermined position based on the position of two reflected lights in the image.

FIG. 18 illustrates a relation between a position of an object and irradiating positions of irradiating lights (one-dot-dashed lines in the figure), when the light emitting unit 420 emits a plurality of lights and irradiates the object. The object is in a plane and may move nearer or farther in a distance detecting direction. Whether the object is in a position A, B, or C, a distance dl between the two irradiating positions is constant. And, when the distance dl is constant, the farther the object is from the photographing apparatus 110, the lesser is the distance between the irradiating positions in the image.

The distance deriving unit 440 derives the distance based on the above relationship. In other words, the distance from the object 102 is derived based on the distance between positions of the reflected lights. A function, which determines the distance from the object using the distance between positions of the reflected lights, may be used.

Alternatively, a look-up table that stores the distance between positions of the reflected lights and the distance from the object may be also used.

The air bag system controlling unit 150 controls an operation of the air bag based on the distance derived by the distance deriving unit 440.

As described above, in the air bag controlling unit 400, the object 102 is irradiated by light in the form of two parallel lines and the distance from the object 102 is derived based on the distance between positions of the reflected light in the image. The distance derived controls the operation of the air bag. Further, the operation of the air bag is appropriately controlled depending on the postures of the object.

Also, in the air bag controlling unit 400, the distance of the object 102 is identified by the distance between the irradiating lights. As a result, it is possible to detect the distance up to different parts of the object, even if the object 102 has various postures.

By detecting the shortest distance between the object and the predetermined position, an explosive power that depends on the distance can be controlled.

In the fourth embodiment, lights in the form of two parallel lines are irradiated to the object 102 and the distance between positions of the reflected lights is used to control the operation of the air bag. However, lights in the form of more than three parallel lines may be used to irradiate the object 102 and the distance between positions of the reflected lights may be derived using two of these lines.

Figure 19:
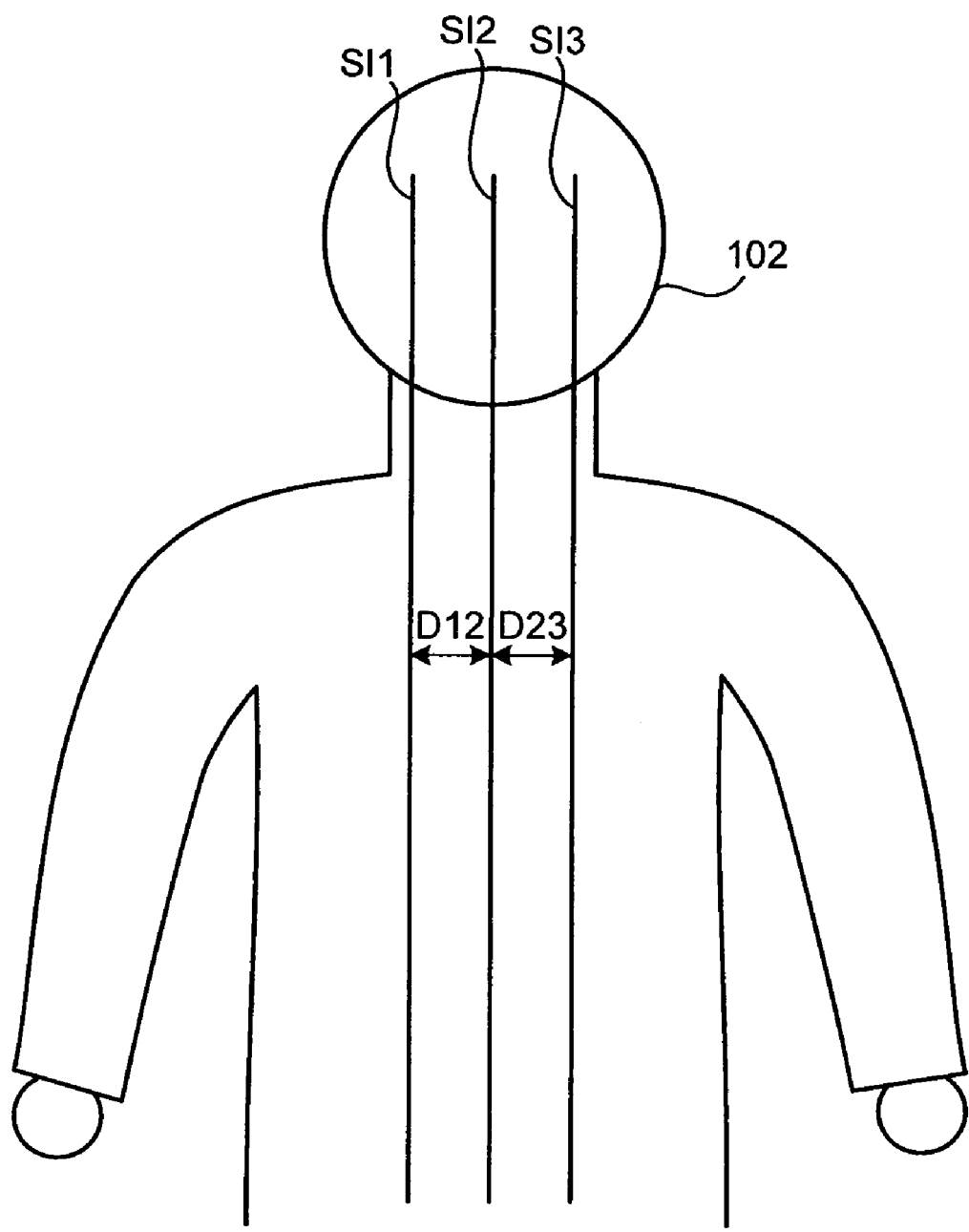
FIG. 19 illustrates an example of an image of the object irradiated with three parallel lights.

For example, as illustrated in FIG. 19, three lights are used, and hence three positions SI1, SI2, and SI3 are photographed in the image. The distance from the object 102 may be derived from a distance D12, which is a distance between the position SI1 and the position SI2, and the distance D23, which is a distance between the position SI2 and the position SI3.

The distance deriving unit 440 may derive the distance from the object 102 using a mean value of the distance D12 and the distance D23, and then output the distance derived to the air bag system controlling unit 150. Alternatively, the smallest distance from the distances derived using the distance D12 or the distance D23, may be output to the air bag system controlling unit 150.

The present invention is not limited to the above embodiments, but can be modified in the ways explained below.

Although the light emitting unit 120 (220, 320, 420) emits light and irradiates the object 102 from an oblique front side, the light may be emitted from other sides as long as the positional relation with the photographing direction of the photographing apparatus 110 fulfills the necessary conditions.

Figure 20:
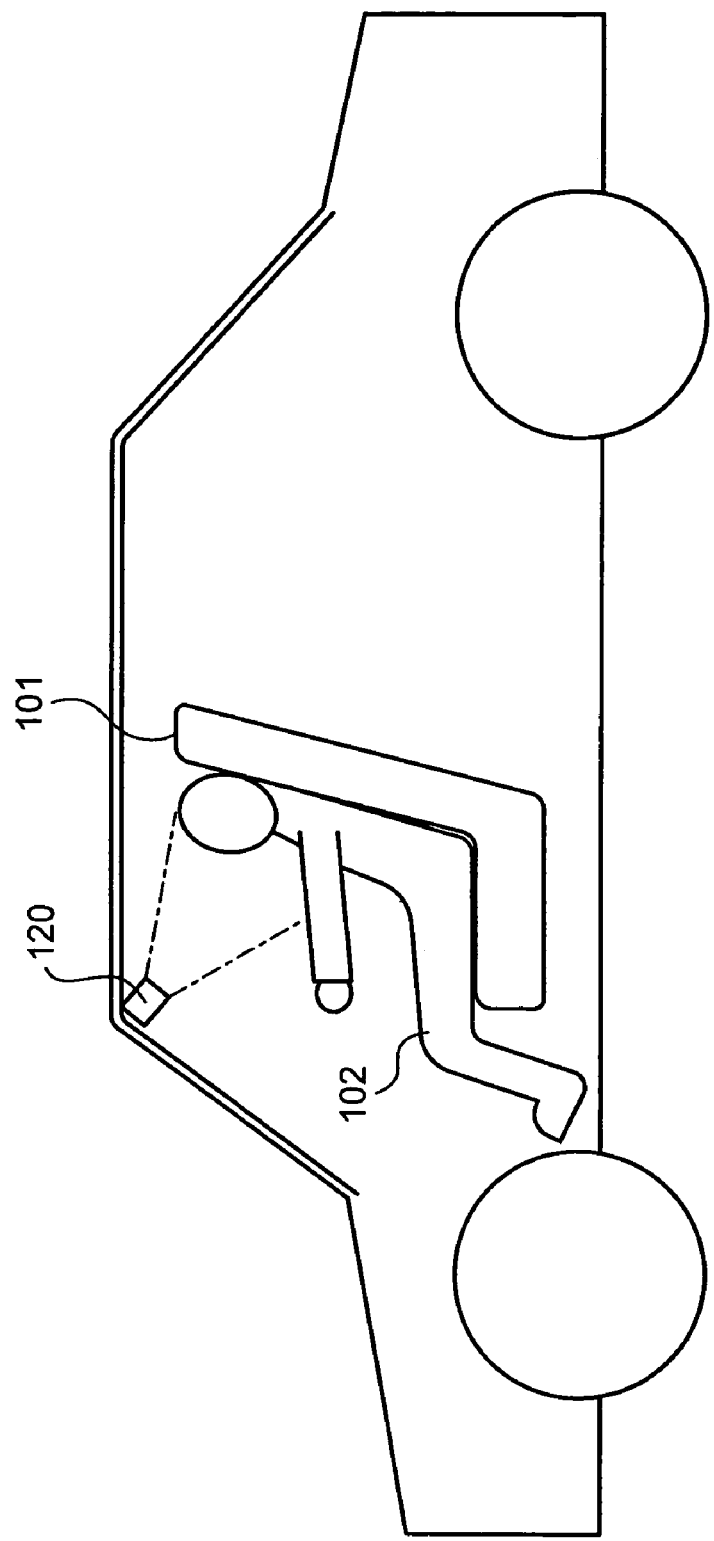
FIG. 20 illustrates an example of a vehicle that is equipped with the light emitting unit according to a first modification of the embodiments.

FIG. 20 illustrates an example of a vehicle that is equipped with the light emitting unit of the air bag system controlling apparatus according to a first modification. The light emitting unit 120 is attached to a front roof above the seat 101, and the light may be emitted from a front side or an upper side of the object 102.

Figure 21:
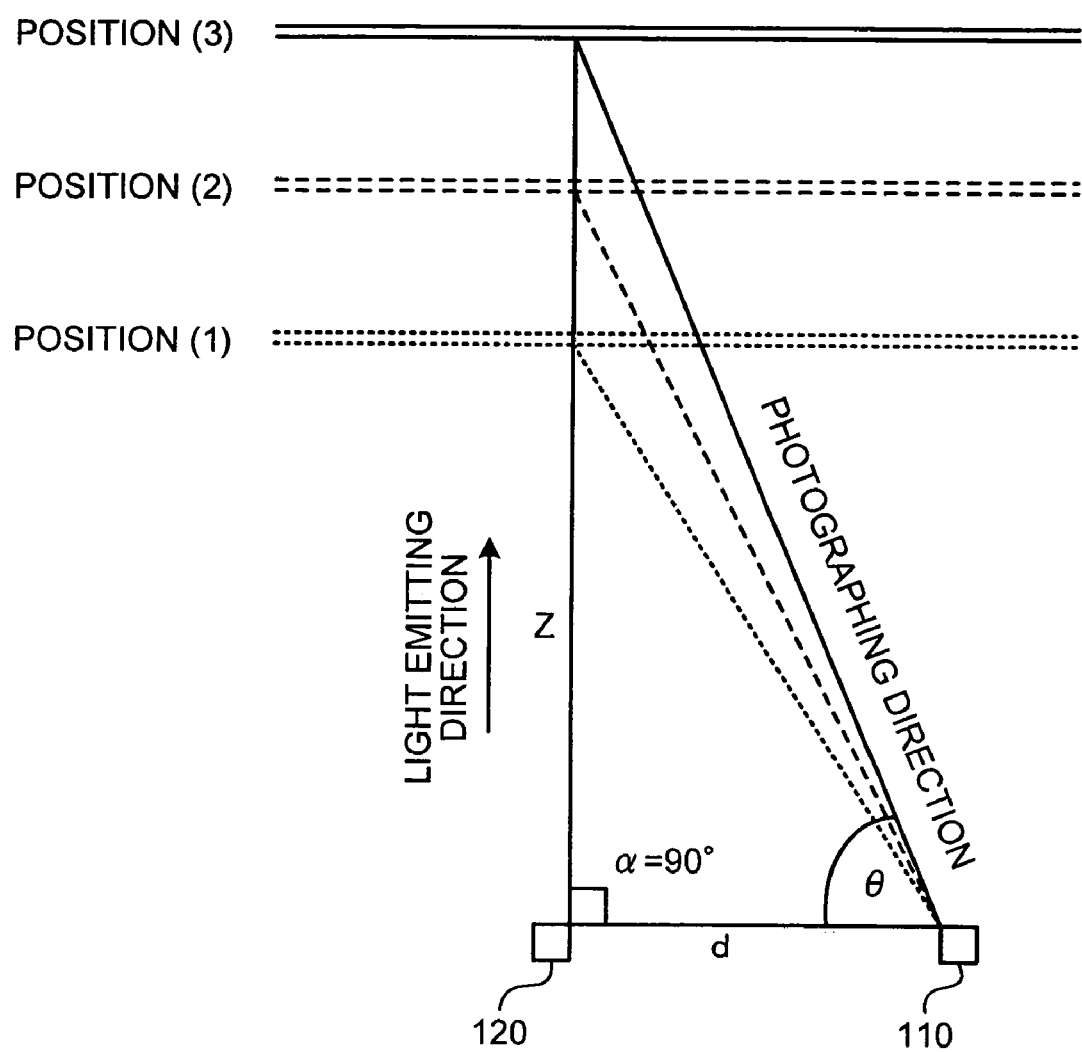
FIG. 21 illustrates a principle for deriving a distance between the object and the predetermined position when the light emitting unit emits light from a front side.

In a case that the light emitting unit 120 emits light and irradiates the object 102 from the front side, that is, in a distance detecting direction, the distance from the object 102 is derived using the same principle as that in the first embodiment. As illustrated in FIG. 21, when a line connecting the light emitting unit 120 and the photographing apparatus 110 is perpendicular to the distance detecting direction, the distance Z between the line and the object 102 can be represented by the equation (1). An angle α is equal to 90°.

Figure 22:
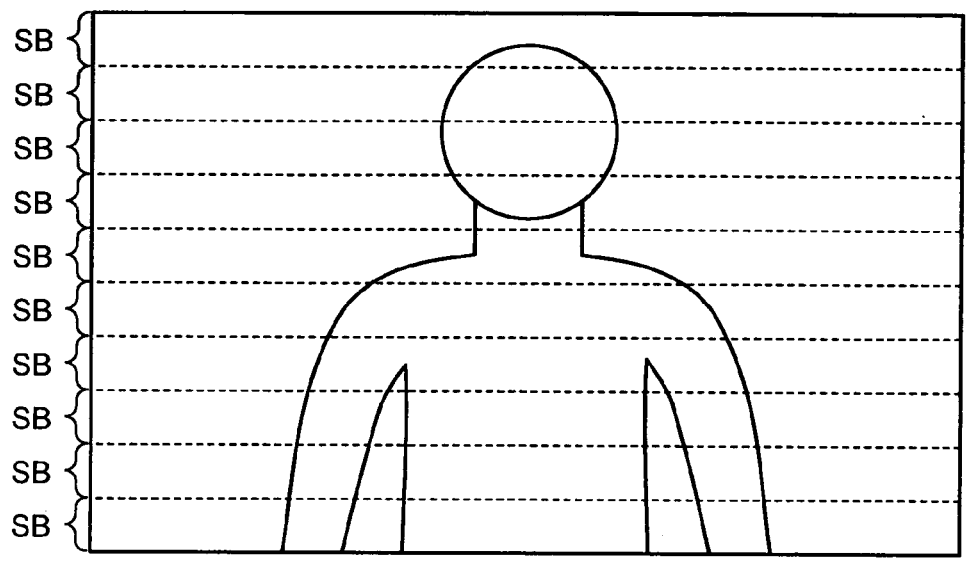
FIG. 22 is an illustration explaining a process, according to an example of a second modification, for determining a high-luminance part.

In the first embodiment, the distance detecting unit 140 chooses a horizontal coordinate value that has a maximum luminance, and generates the function P(y) that represents the position of the reflected light. This function P(y) uses a vertical coordinate as a parameter and the high-luminance part is identified in each horizontal line. On the other hand, as one example of a second modification, the position of the reflected light Ph may be identified in each small block SB (see FIG. 22).

Figure 23:
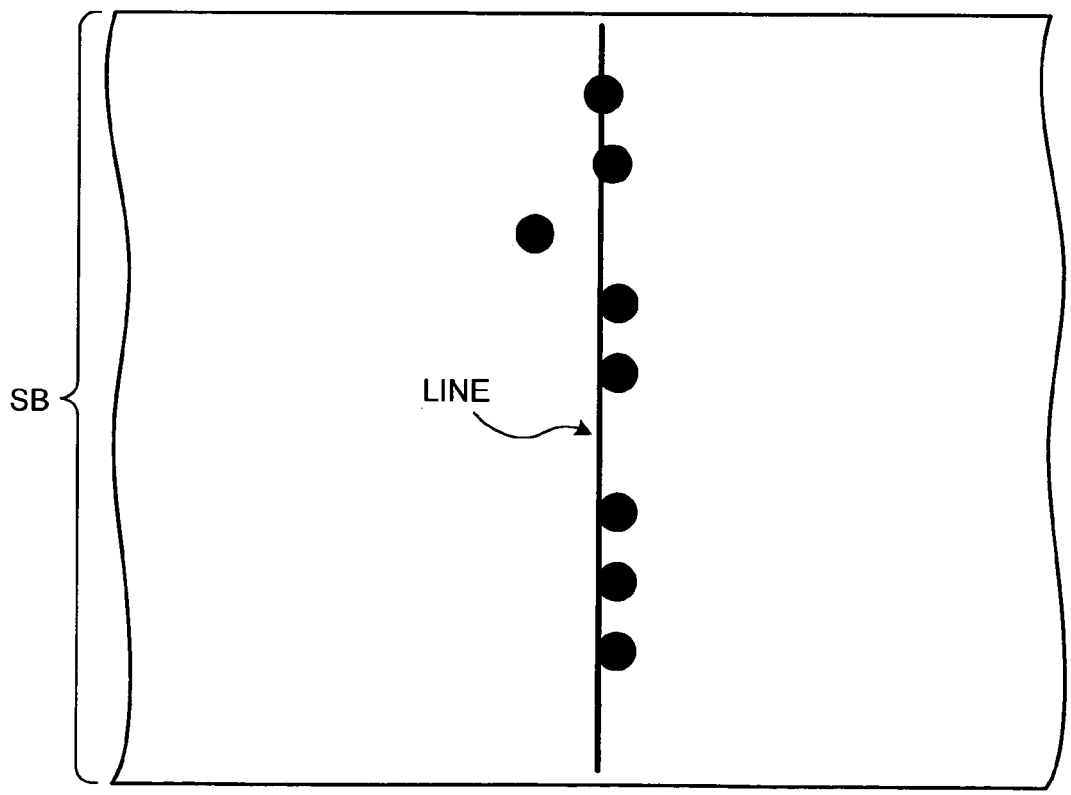
FIG. 23 is an illustration explaining a process for determining a high-luminance part in a small block.

As illustrated in FIG. 23, a line is derived using least square approximation, based on positions of high-luminance pixels (shown as black circles) identified in a small block SB. The line derived represents the position of the reflected light in each small block SB, and then a position of the reflected light Ph is derived from the positions of the reflected lights in the image. Therefore, the position of the reflected light Ph, which represents the smallest distance from the object 102, is identified.

Accordingly, even if the high-luminance part varies widely because of noise, an average position of the reflected lights can eliminate an influence of noise. As a result, the distance can be detected more accurately.

Figure 24:
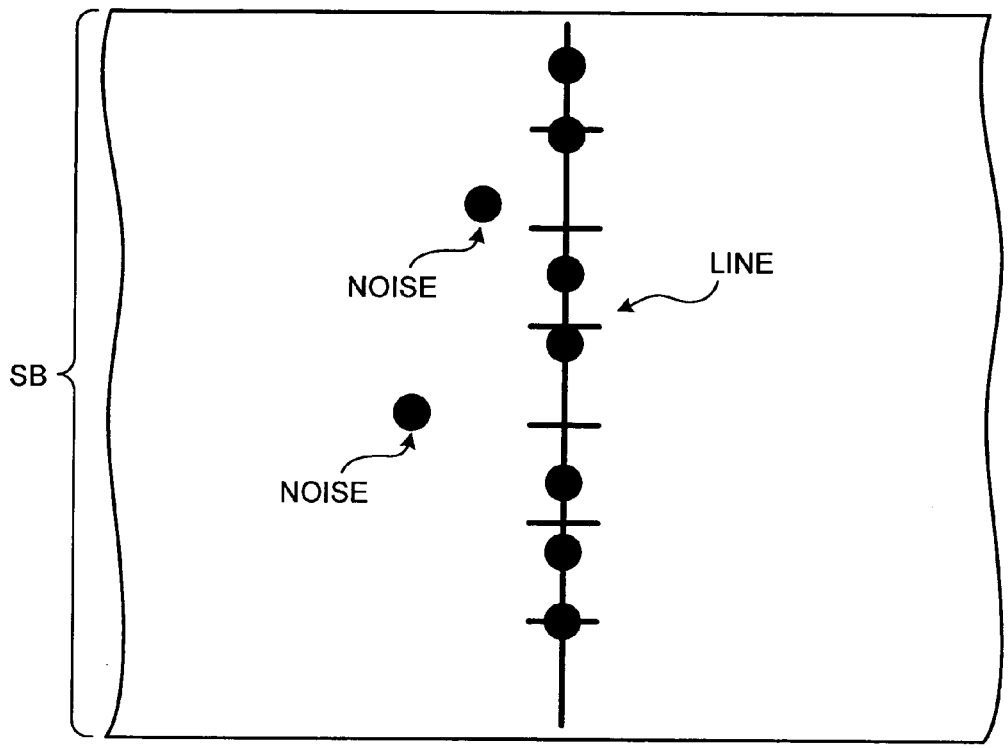
FIG. 24 is another illustration explaining a process for determining a high-luminance part in a small block.

Similarly, in the third embodiment, a line may be derived using least square approximation based on the positions of the cross marks, and then a position of the reflected light Ph may be derived from the line, as illustrated in FIG. 24.

The line in each small block SB must be continuous so that the entire line is continuous to a certain extent. The reflected light does not always form a straight line because the object 102 is not in a plane and is likely to be slanted.

Figure 25:
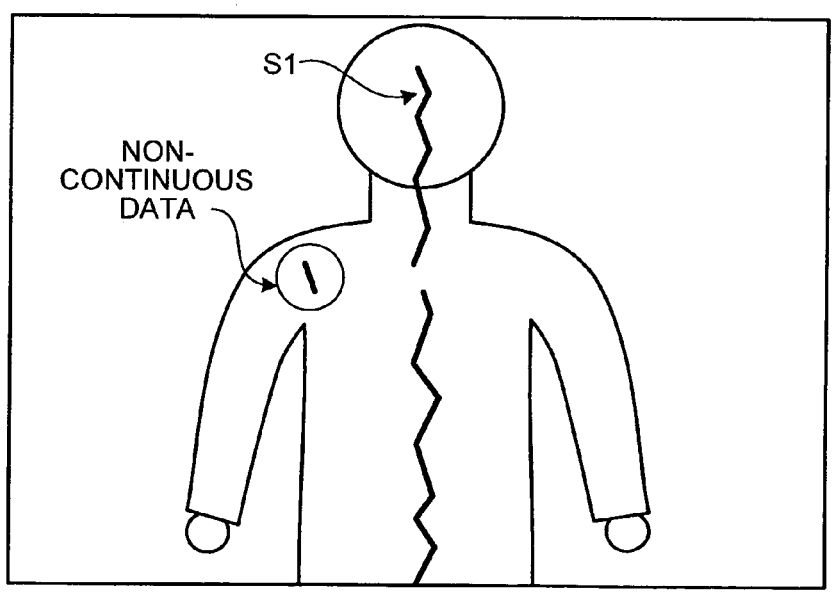
FIG. 25 is an illustration explaining a process for determining a high-luminance part by eliminating non-continuous data.

If there is a non-continuous part in the image, the non-continuous part is excluded from the image, and the position of the reflected light is identified. In FIG. 25, a high-luminance part, which is circled, is detected as noise and excluded from the image. In other words, the high-luminance part that is continuous is detected as the reflected light.

The non-continuous part is detected as follows. The horizontal coordinate value of a line in a small block SB is compared with coordinate values of other lines in other small blocks. The horizontal coordinate value that is far from other values, is considered as the non-continuous part.

As described above, a non-continuous part in the image is considered as noise. However, the distance may be derived by identifying the position of the reflected light by other predetermined rules.

Figure 26:
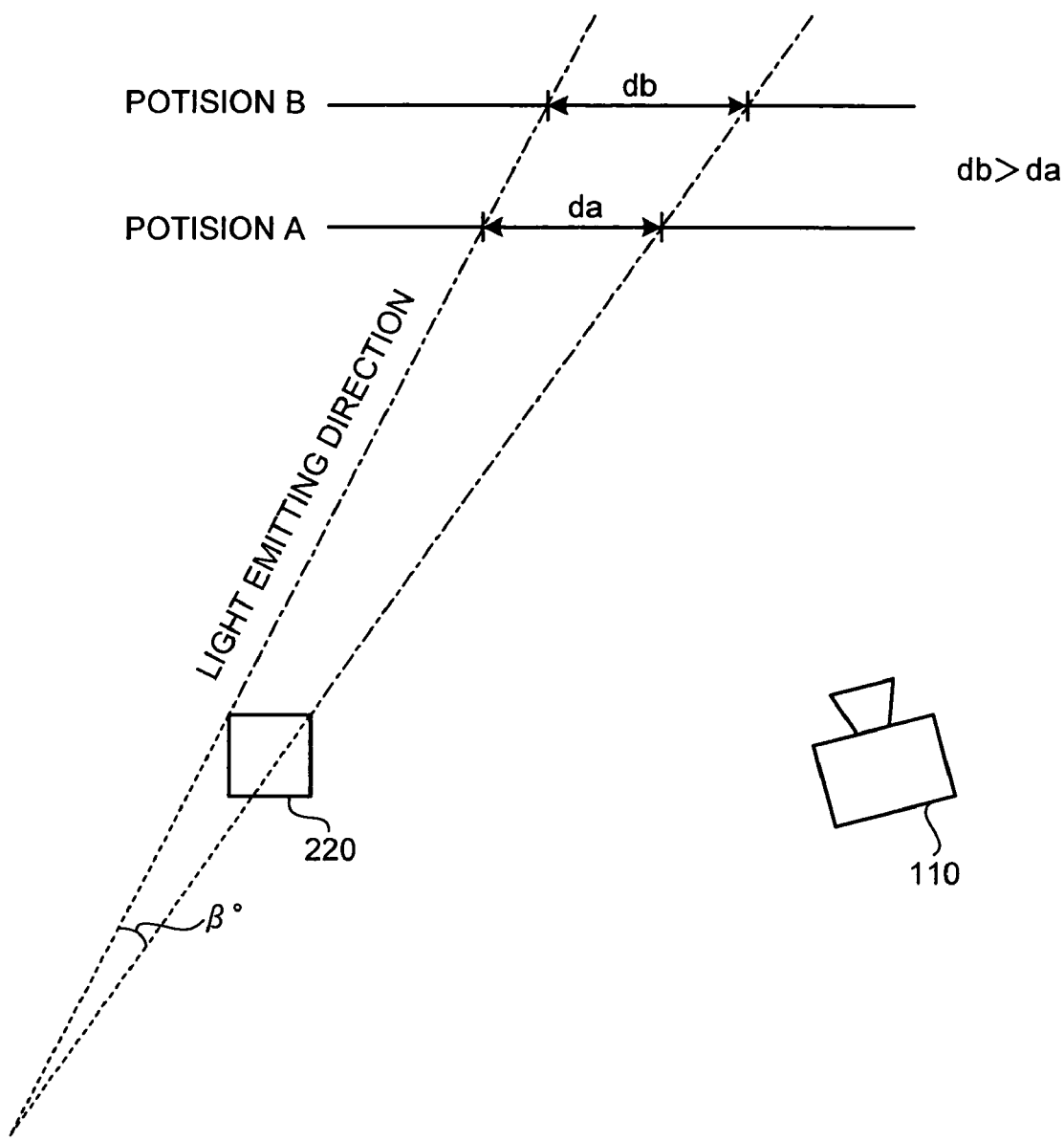
FIG. 26 illustrates a relation between a position of an object and positions of irradiating lights, according to a third modification.

In the second embodiment, the light emitting unit 220 emits two lights, which have a relation as follows. As illustrated in FIG. 26, the two lights are emitted at an angle β, and are not parallel to each other. In such a state, the farther an object is from the light emitting unit 220, the greater is the distance between irradiating positions.

More precisely, when the object is in a position A near the light emitting unit 220, a distance 'da' represents a distance between the two irradiating positions. When the object is in a position B distant from the light emitting unit 220, a distance 'db' represents a distance between the two irradiating positions. Comparing the distance 'da' with the distance db, the distance 'db' is greater than the distance 'da'.

In the fourth embodiment, when the distance between the irradiating positions is constant, the farther the object is from the photographing apparatus 110, the distance between the irradiating positions becomes shorter in the image. As a third modification, the two lights may be emitted at an angle β and the distance between the irradiating positions is constant in the image. This angle β is derived under a condition that the object is in a plane, which is perpendicular to a distance detecting direction.

In the second embodiment, the distance deriving unit 240 derives the distance from the object 102 based on the identified positions of the two lights in the form of a straight line. If the object is in a plane that is perpendicular to the distance detecting direction, the distance between the two lights is constant.

However, in the third modification, the distance deriving unit 240 identifies high-luminance parts from the two lights in the form of straight lines, and compares a distance between the high-luminance parts with the constant distance between the two lights as explained above. If the distance between the high-luminance parts corresponds with the constant distance, the two high-luminance parts are detected as positions of the reflected lights. However, if the distance between the high-luminance parts does not correspond with the constant distance, the two high-luminance parts are detected as positions of the reflected lights provided that a difference between these distances is within a margin of an error.

Thus, other unrelated lights in the form of straight lines present in the image are not detected. Consequently, the position of the reflected light is identified accurately and the distance is derived.

In each embodiment, the distance is derived using the image photographed by the photographing apparatus 110 when the light emitting unit 120 (220, 320, 420) emits light and irradiates the object 102. However, as a fourth modification, the distance may be also derived based on both, an image when light is emitted, and an image when light is not emitted.

More precisely, the air bag system controlling unit 150 controls the light emitting unit 120 (220, 320, 420) and the photographing apparatus 110 at the time of the operation of the air bag. After photographing a first image when light is emitted, the air bag system controlling unit 150 controls the light emitting unit 120 (220, 320, 420) so as not to emit light, and then a second image is photographed.

Figure 27:
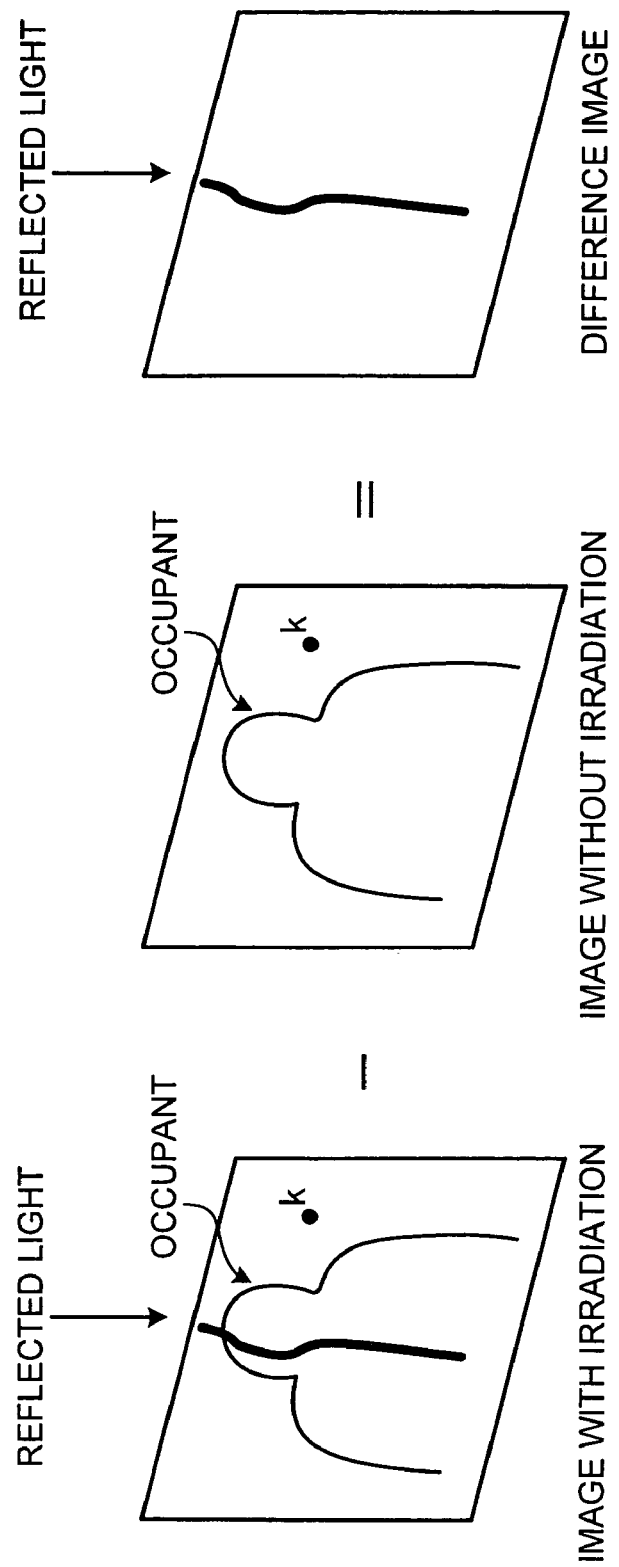
FIG. 27 illustrates an example of how reflected light is extracted from two images according to a fourth modification.

Accordingly, as illustrated in FIGS. 27 and 28, the first image includes a line of the reflected light on the upper body of the object 102. On the other hand, the second image, when light is not emitted, includes the object 102, but does not include the reflected light.

Thus, in the fourth modification, the distance deriving unit 140 (240, 340, 440) extracts the reflected light based on a difference between the two images and identifies a position of the reflected light. In other words, an image that includes only the reflected light (hereinafter, "difference image") is obtained by deducting the second image from the first image. Therefore, a high-luminance part k, which is caused by other lights, is excluded from the difference image.

Thus, the position of the reflected light identified in the difference image is used to derive the distance of the object 102 from the predetermined position.

As described above, the distance detecting unit derives the distance from the object 102 based on the image when light is emitted by the light emitting unit. In each embodiment, the distance detecting unit and the distance deriving method are applied to the air bag controlling apparatus.

The distance detecting unit and the distance deriving method are also used for other purposes. For example, the distance detecting unit and the distance deriving method may be used as an interface in game machines. More precisely, this invention may be applied in game machines in order to detect a distance between a player and a predetermined position, and the distance may be reflected as an indicating signal from the player in a game process.

When the distance detecting unit and the distance deriving method are applied to other purposes, any object can be detected. As a fifth modification, if the position of the object fulfils conditions given below, the high luminance pattern forms a straight vertical line in the image. A first condition is that the object must be in a plane that is perpendicular to the distance detecting direction. A second condition is that a normal vector on the plane shares a plane with another normal vector, which is in a plane that includes the light emitting direction and the light distributing direction. The position of the reflected light may be identified using a known method of detecting a straight line, such as Hough Transform.

If the object is in the plane as described above, the high-luminance pattern is supposed to form a straight line. However, in fact, the function P(y) does not generate constant values if noise is present. Therefore, the position of the reflected light can be identified using an averaged value or a median by the function P(y), thereby eliminating noise.

Figure 29:
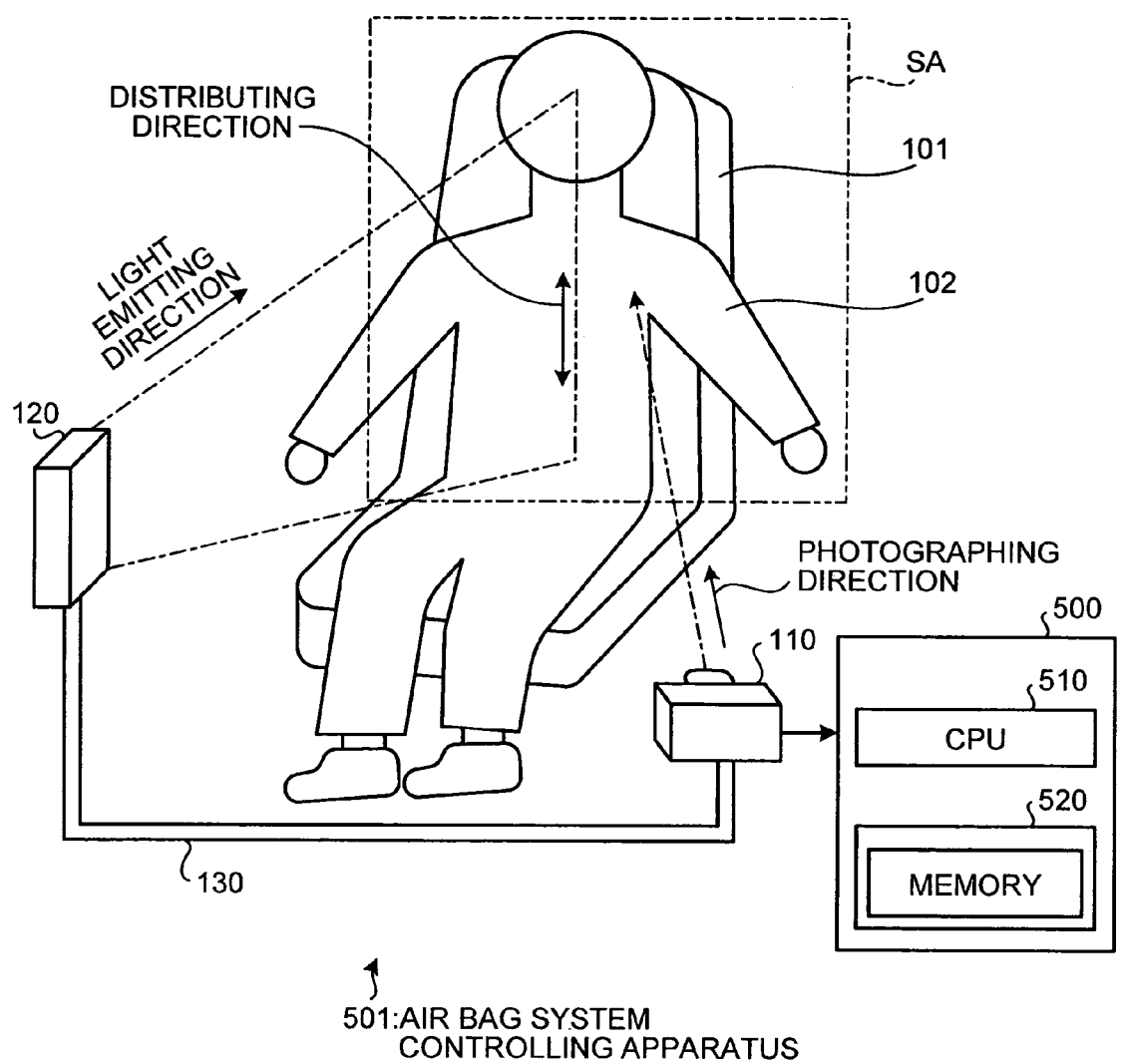
FIG. 29 is an illustration of a structure of the air bag system controlling apparatus according to a sixth modification.

As described above, the distance deriving unit 140 (240, 340, 440) and the air bag system controlling unit 150 are composed of hardware circuits. However, as a sixth modification, a computer unit 500, which includes a central processing unit (CPU) 510 and a memory 520, may be used instead of the distance deriving unit and the air bag system controlling unit (see FIG. 29). The computer unit 500 may include programs that realize a distance detecting process and an air bag controlling process.

In other words, an air bag system controlling apparatus 501 may be composed of the computer unit 500, which executes the same processes as those in each of the above embodiments. At the time of the operation of the air bag, the computer unit 500 runs programs such as the distance detecting process and the air bag controlling process stored in the memory 520.

The present invention has been described for detecting a distance of a part of an object from a predetermined position. However the present invention is not limited thereto, and can be applied to detecting a distance of the entire object.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A distance detecting apparatus comprising:
a light emitting unit that emits a light in a light emitting direction which is the direction to an object, the light having a plurality of pattern lights which are in the form of a line;
a photographing device that obtains an image of the object along a photographing direction; and
a distance deriving unit that derives a distance between the object and a predetermined position based on an interval between the pattern lights in the image.

2. An airbag system controlling apparatus comprising:
a light emitting unit that emits a light in a light emitting direction which is the direction to an object seated in a seat of a vehicle, the light having a plurality of pattern lights which are in the form of a line;
a photographing device that obtains an image of the object along a photographing direction;

a distance deriving unit that derives a distance between the object and a predetermined position based on an interval between at least two of the pattern lights in the image; and an air bag system controlling unit that controls an operation of an air bag based on the distance derived.

3. The air bag system controlling apparatus according to claim 2, wherein the distance deriving unit stores a relation between intervals between the distributed pattern of the light in the image and distances, and derives the distance by referring to the relation stored.

4. The air bag system controlling apparatus according to claim 2, wherein the light emitting unit emits a infrared light, and the photographing device obtains an infrared image.

5. The air bag system controlling apparatus according to claim 2, wherein the light emitting unit emits the light when an operation of the air bag system controlling unit is required, and the distance deriving unit derives the distance based on the image when the light emitting unit emits the light.

6. An airbag system controlling apparatus comprising:

a light emitting unit that emits a light in a light emitting direction which is the direction to an object seated in a seat of a vehicle, the light having a plurality of pattern lights which are in the form of a line;

a photographing device that obtains an image of the object along a photographing direction;

a memory that stores a computer program that makes it possible to execute a function of deriving a distance between the object and a predetermined position based on an interval between at least two of the pattern lights in the image obtained by the photographing device, and a function of controlling an operation of an air bag based on the distance derived; and a processor that can access the memory unit and execute the computer program.

7. The air bag system controlling apparatus according to claim 6, wherein the light emitting unit emits a infrared light, and the photographing device obtains an infrared image.

8. The air bag system controlling apparatus according to claim 6, wherein the light emitting unit emits the light when an operation of the air bag system controlling unit is required, and the distance deriving unit derives the distance based on the image when the light emitting unit emits the light.

9. A method of detecting a distance, comprising:

emitting light in a light emitting direction to thereby irradiate an object, the light having a plurality of pattern lights which are in the form of a line;

obtaining an image of the object along a photographing direction; and deriving a distance between the object and a predetermined position based on an interval between the pattern lights in the image.

* * * * *